United States Patent
Nakamae et al.

(10) Patent No.: US 10,096,092 B2
(45) Date of Patent: Oct. 9, 2018

(54) IMAGE PROCESSING SYSTEM AND COMPUTER-READABLE RECORDING MEDIUM

(71) Applicant: EIZO Corporation, Ishikawa (JP)

(72) Inventors: Takashi Nakamae, Ishikawa (JP); Masafumi Higashi, Ishikawa (JP); Reo Aoki, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/372,402

(22) Filed: Dec. 8, 2016

(65) Prior Publication Data

US 2017/0091912 A1    Mar. 30, 2017

Related U.S. Application Data

(63) Continuation of application No. PCT/JP2015/062729, filed on Apr. 27, 2015, and a
(Continued)

(51) Int. Cl.
*G06K 9/00* (2006.01)
*G06T 5/00* (2006.01)
(Continued)

(52) U.S. Cl.
CPC ............ *G06T 5/003* (2013.01); *G06K 9/4604* (2013.01); *G06T 5/20* (2013.01); *G06T 7/136* (2017.01); *G06T 7/50* (2017.01)

(58) Field of Classification Search
CPC .. G06T 5/003; G06T 5/20; G06T 7/50; G06T 7/136; G06K 9/4604
See application file for complete search history.

(56) References Cited

U.S. PATENT DOCUMENTS 6,085,152 A * 7/2000 Doerfel ................... G01S 7/003
                                                                  702/3
7,161,614 B1    1/2007 Yamashita et al.
(Continued)

FOREIGN PATENT DOCUMENTS

| CN | 202872972 U | 4/2013 |
| CN | 103337054 A | 10/2013 |

(Continued)

OTHER PUBLICATIONS

Extended European Search Report for European Patent Application No. 15 805 972.5, issued by the European Patent Office dated Sep. 12, 2017.
(Continued)

*Primary Examiner* — John Strege

(57) ABSTRACT

A technique to remove fog from an image more appropriately has been called for. An image processing system is provided, including: a haze depth estimating unit that derives a haze depth estimate value of one frame among a plurality of frames included in a moving image; a parameter adjusting unit that adjusts a parameter to be used in a haze removal process of the one frame based on a haze depth estimate value of the one frame, and a relationship between the one frame and a past frame of the one frame; and a haze removing unit that executes a haze removal process on the one frame based on the parameter adjusted by the parameter adjusting unit.

10 Claims, 10 Drawing Sheets

Related U.S. Application Data continuation-in-part of application No. PCT/JP2015/056086, filed on Mar. 2, 2015, and a continuation-in-part of application No. PCT/JP2014/003131, filed on Jun. 12, 2014.

(51) Int. Cl.

| | |
|---|---|
| G06T 7/50 | (2017.01) |
| G06T 7/136 | (2017.01) |
| G06K 9/46 | (2006.01) |
| G06T 5/20 | (2006.01) |

(56) References Cited

U.S. PATENT DOCUMENTS

| | | | | |
|---|---|---|---|---|
| 7,656,277 | B2* | 2/2010 | Kawasaki | G06K 9/00798 |
| | | | | 340/425.5 |
| 8,290,294 | B2* | 10/2012 | Kopf | G06K 9/00624 |
| | | | | 382/167 |
| 8,619,071 | B2* | 12/2013 | Kopf | G06T 15/20 |
| | | | | 345/419 |
| 9,076,389 | B2* | 7/2015 | Haraguchi | G09G 3/002 |
| 9,177,363 | B1* | 11/2015 | Huang | G06T 5/003 |
| 9,305,339 | B2* | 4/2016 | Yang | G06K 9/40 |
| 9,336,581 | B2* | 5/2016 | Abe | G09G 5/02 |
| 9,384,532 | B2* | 7/2016 | Hong | G06T 5/002 |
| 9,418,402 | B2* | 8/2016 | Hong | G06K 9/4661 |
| 9,473,692 | B2* | 10/2016 | Saito | H04N 5/23222 |
| 9,646,364 | B1* | 5/2017 | Wang | G06T 5/00 |
| 9,691,141 | B2* | 6/2017 | Shin | G06T 3/4015 |
| 9,870,511 | B2* | 1/2018 | Mittal | G06K 9/00791 |
| 2007/0225560 | A1* | 9/2007 | Avni | A61B 1/00006 |
| | | | | 600/118 |
| 2008/0170754 | A1* | 7/2008 | Kawasaki | G06K 9/00805 |
| | | | | 382/104 |
| 2010/0259651 | A1* | 10/2010 | Fattal | G06T 5/003 |
| | | | | 348/241 |
| 2010/0322478 | A1 | 12/2010 | Nitanda | |
| 2011/0090216 | A1 | 4/2011 | Yamada et al. | |
| 2011/0135200 | A1 | 6/2011 | Chen et al. | |
| 2011/0261261 | A1 | 10/2011 | Mori et al. | |
| 2012/0002871 | A1 | 1/2012 | Hu et al. | |
| 2012/0019692 | A1 | 1/2012 | Tatsuzawa | |
| 2012/0301033 | A1 | 11/2012 | Fukunaga | |
| 2012/0328205 | A1 | 12/2012 | Wen et al. | |
| 2013/0141594 | A1* | 6/2013 | Hartley | G06T 5/003 |
| | | | | 348/207.1 |
| 2013/0237317 | A1 | 9/2013 | Rychagov et al. | |
| 2014/0140619 | A1* | 5/2014 | Mukhopadhyay | G06T 5/40 |
| | | | | 382/167 |
| 2014/0177960 | A1* | 6/2014 | Park | G06T 5/003 |
| | | | | 382/167 |
| 2015/0123985 | A1* | 5/2015 | Abe | G06T 5/008 |
| | | | | 345/590 |
| 2015/0279011 | A1* | 10/2015 | Jeon | G06T 5/005 |
| | | | | 382/167 |
| 2016/0196640 | A1* | 7/2016 | Kino | G06T 5/40 |
| | | | | 348/234 |
| 2016/0314371 | A1* | 10/2016 | Wang | H04N 19/136 |
| 2017/0132761 | A1* | 5/2017 | Wang | G06T 5/00 |
| 2017/0178297 | A1* | 6/2017 | Fattal | G06T 5/003 |

FOREIGN PATENT DOCUMENTS

| | | |
|---|---|---|
| CN | 103632339 A | 3/2014 |
| JP | 2012-168936 A | 9/2012 |
| JP | 2013-152334 A | 8/2013 |
| RU | 2365993 C1 | 8/2009 |

OTHER PUBLICATIONS

Office Action issued for counterpart Australian Application 2015272846, issued by the Australian Patent Office dated Sep. 28, 2017.

Koprinska, I. et al., "Temporal video segmentation: A survey", Signal Processing. Image Communication, Elsevier Science Publishers, Amsterdam, NL, (Jan. 1, 2001), vol. 16, No. 5, doi:10.1016/S0923-5965(00)0011-4, ISSN 0923-5965, pp. 477-500.

Fu Xueyang et al:"A novel retinex based approach for image enhancement with illumination adjustment", 2014 IEEE International Conference on Acoustics,Speech and Signal Processing (ICASSP),IEEE, May 4, 2014, pp. 1190-1194, XP032617073,DOI:10.1109/ICASSP.2014.6853785[retrieved on Jul. 11, 2014]*p. 1191-p. 1192*.

Office Action issued for counterpart Australian Application No. 2015272798, issued by the Australian Patent Office dated Aug. 9, 2017.

Office Action issued for counterpart Australian Application No. 2015272799, issued by the Australian Patent Office dated Aug. 28, 2017.

Office Action for European Patent Application No. 14 894 614.8, issued by the European Patent Office dated Aug. 29, 2017.

Renjie He et al:"Single Image Dehazing with White Balance Correction and Image Decomposition",Digital Image Computing Techniques and Applications (DICTA),2012 International Conference on, IEEE, Dec. 3, 2012,pp. 1-7,XP032310805,DOI:10.1109/DICTA.2012.6411690, ISBN:978-1-4673-2180-8, * Sectioin II. The proposed Algorithm*.

Sudharsan Parthasarathy et al:"A RETINEX based haze removal method",Industrial and Information Systems (ICIIS),2012 7th IEEE Internaitonal Conference on, IEEE, Aug. 6, 2012, pp. 1-6,XP032237754,DOI:10.1109/ICIINFS.2012.6304767,ISBN:978-1-4673-2603-2,*Section IV. Retinex based Enhancement*.

Bin-Na Yu et al:"Visibility Enhancement Based Real—Time Retinex for Diverse Environment",Signal Image Technology and Internet Based Systems (SITIS),2012 Eighth International Conference on, IEEE, Nov. 25, 2012, pp. 72-79,XP032348495,DOI:10.1109/SITIS.2012.22,ISBN:978-1-4673-5152-2,*Section III. Proposed Method*.

Chen-Jui Chung et al:"Under-exposed image enhancement using exposure compensation",2013 13th International Conference on Its Telecommunications (ITST),IEEE, Nov. 5, 2013, pp. 204-209,XP032532134,DOI:10.1109/ITST.2013.6685546[retrieved on Dec. 16, 2013],*3.Proposed Method*.

Extended European Search Report for European Patent Application No. 14894614.8, issued by the European Patent Office dated Feb. 24, 2017.

International Preliminary Report on Patentability for International Application No. PCT/JP2015/062729, issued by the International Bureau of WIPO dated Dec. 22, 2016.

International Preliminary Report on Patentability for International Application No. PCT/JP2015/056086, issued by the International Bureau of WIPO dated Dec. 22, 2016.

International Search Report for International Application No. PCT/JP2015/062729, issued by the Japan Patent Office dated Jun. 30, 2015.

Kazuyasu Owaki et al., "ContrastMagic technology to optimize image brightness and contrast", Toshiba Review, Jun. 1, 2009, vol. 64, No. 6, pp. 19 to 22.

Kaiming He et al., Single Image Haze Removal Using Dark Channel Prior, IEEE Transactions on Pattern Analysis and Machine Intelligence (TPAMI), 201112, vol. 33, No. 12, pp. 2341-2353.

International Search Report for International Application No. PCT/JP2014/003131, issued by the Japan Patent Office dated Jul. 22, 2014.

Vadivel A et al:"Object Level Frame Comparison for Video Shot Detection", 2005 Seventh IEEE Workshops on Applications of Computer Vision(WACV/Motion'05)—Jan. 5-7, 2005—Breckenridge, CO, USA, IEEE, Los Alamitos, Calif., USA, Jan. 5, 2005, pp. 235-240, XP032120906 DOI: 10.1109/ACVMOT.2005.86 ISBN:978-0-7695-2271-5 *section 2.1*.

Dubok Park et al:"Fog-degraded image restoration using characteristics of RGB channel in single monocular image", Consumer Electronics (ICCE), 2012 IEEE International Conference on, IEEE, Jan. 13, 2012, pp. 139-140, XP032124856, DOI:10.1109/ICCE.2012.6161832 ISBN:978-1-4577-0230-3 *sections II.A, II.B and II.C; figures 1, 2*.

(56) References Cited

OTHER PUBLICATIONS

Kim Jin-Hwan et al:"Optimized contrast enhancement for real-time image and video dehazing", Journal of Visual Communication and Image Representation, Academic Press, Inc, US, vol. 24, No. 3, Feb. 18, 2013, pp. 410-425, XP028996774, ISSN:1047-3203, DOI:10.1016/J.JVCIR.2013.02.004 *section 4.1*.

Yeo B-L et al:"Rapid Scene Analysis on Compressed Video", IEEE Transactions on Circuits and Systems for Video Technology, IEEE Service Center, Piscataway, NJ, US, vol. 5, No. 6, Dec. 1, 1995, pp. 533-544, XP000545960, ISSN:1051-8215, DOI:10.1109/76.475896 *section I.*.

Partial Supplementary European Search Report for European Patent Application No. 15805972.5, issued by the European Patent Office dated Jun. 12, 2017.

Extended European Search Report for European Patent Application No. 15806110.1, issued by the European Patent Office dated Jun. 8, 2017.

Extended European Search Report for European Patent Application No. 15807220.7, issued by the European Patent Office dated Jun. 8, 2017.

Office Action issued for counterpart Australian Application No. 2014397095, issued by the Australian Patent Office dated Jan. 9, 2018.

Office Action issued for counterpart Russian Application No. 2017100018, issued by the Russian PTO dated Jan. 25, 2018.

Office Action issued for counterpart European Application No. 14894614.8, issued by the European Patent Office dated Mar. 12, 2018.

Office Action issued for counterpart European Patent Application No. 15 806 110.1, issued by the European Patent Office dated Apr. 25, 2018.

Office Action issued for counterpart Australian Application 2014397095, issued by the Australian Patent Office dated Apr. 27, 2018.

Office Action issued for counterpart U.S. Appl. No. 15/371,228, issued by the USPTO dated Mar. 8, 2018.

Office Action issued for counterpart U.S. Appl. No. 15/371,230, issued by the USPTO dated Mar. 29, 2018.

Office Action issued for counterpart Chinese Application 201580031438.9, issued by the Chinese Intellectual Property Office dated Aug. 15, 2018.

Shu Ting et al., "Defogging Algorithm Based on the Prior Dark-Channel and Theory of Retinex", Natural Science Edition, Journal of Jishou University, Mar. 31, 2014, vol. 35, Issue No. 2, China.

* cited by examiner

IMAGE PROCESSING SYSTEM AND COMPUTER-READABLE RECORDING MEDIUM

The contents of the following patent applications are incorporated herein by reference: No. PCT/JP2014/003131 filed on Jun. 12, 2014, PCT/JP2015/056086 filed on Mar. 2, 2015 and PCT/JP2015/062729 filed on Apr. 27, 2015.

BACKGROUND

1. Technical Field

The present invention relates to an image processing system and a computer-readable recording medium. In the United States, the present application is a continuation-in-part application of the international application No. PCT/JP2014/003131 (application date: Jun. 12, 2014), and a continuation-in-part application of the international application No. PCT/JP2015/056086 (application date: Mar. 2, 2015).

2. Related Art

A technique to remove fog in an image based on an atmospheric model has been known (please see, for example, Patent Document 1).

PRIOR ART DOCUMENTS

Patent Document

[Patent Document 1] Japanese Patent Application Publication No. 2012-168936

A technique to remove fog from an image more appropriately has been called for.

SUMMARY

According to a first aspect of the present invention, an image processing system is provided. The image processing system may include: a haze depth estimating unit that derives a haze depth estimate value of one frame among a plurality of frames included in a moving image. The image processing system may include a parameter adjusting unit that adjusts a parameter to be used in a haze removal process of the one frame based on a haze depth estimate value of the one frame, and a relationship between the one frame and a past frame of the one frame. The image processing system may include a haze removing unit that executes a haze removal process on the one frame based on the parameter adjusted by the parameter adjusting unit.

Using a haze depth estimate value of the one frame as a haze depth target value of the one frame, the parameter adjusting unit may adjust a parameter to be used in a haze removal process of the one frame such that the parameter adjusted in the past frame becomes close to, stepwise, the haze depth target value. The image processing system may further include a scene change judging unit that judges whether or not the one frame is a frame in which a scene change occurs, wherein when the scene change judging unit judges that in a relationship between the one frame and the past frame, the one frame is a frame in which a scene change occurs, the parameter adjusting unit may increase stepwidths at which the parameter is made close to, stepwise, the haze depth target value. The image processing system may further include: a haze reliability estimating unit that estimates a reliability of the haze depth estimate value; a target value acquiring unit that acquires a haze depth target value of the past frame; a target value determining unit that determines, as a haze depth target value of the one frame, either the haze depth target value of the past frame acquired by the target value acquiring unit or a haze depth estimate value of the one frame derived by the haze depth estimating unit; and a difference absolute value deriving unit that derives a difference absolute value between a haze depth target value of the one frame determined by the target value determining unit and a parameter used in a haze removal process of a past frame of the one frame, wherein the parameter adjusting unit may adjust a parameter to be used in a haze removal process of the one frame with an adjustment amount corresponding to: the reliability; the difference absolute value; and whether or not the one frame is a frame in which a scene change occurs, such that a parameter used in a haze removal process of the past frame becomes close to, stepwise, a haze depth target value of the one frame determined by the target value determining unit. When the one frame is judged as a frame in which a scene change occurs, the parameter adjusting unit may adjust the parameter with a first adjustment amount, when the one frame is judged as not a frame in which a scene change occurs, a reliability of the estimate value is higher than a first threshold, and the difference absolute value is higher than a second threshold, the parameter adjusting unit may adjust the parameter with a second adjustment amount smaller than the first adjustment amount, and when the one frame is judged as not a frame in which a scene change occurs, and a reliability of the estimate value is lower than the first threshold or the difference absolute value is lower than the second threshold, the parameter adjusting unit may adjust the parameter with a third adjustment amount smaller than the second adjustment amount.

The image processing system may further include a haze reliability estimating unit that estimates a reliability of the haze depth estimate value, wherein when the haze reliability estimating unit judges that in the one frame, the haze depth estimate value is not reliable, the parameter adjusting unit may adjust a parameter to be used in a haze removal process of the one frame such that it becomes close to, stepwise, a target value set at a time of the past frame. The image processing system may further include: a haze reliability estimating unit that estimates a reliability of the haze depth estimate value; a target value acquiring unit that acquires a haze depth target value of the past frame; and a target value determining unit that, based on the reliability estimated by the haze reliability estimating unit, determines which one, the haze depth target value of the past frame acquired by the target value acquiring unit or a haze depth estimate value of the one frame derived by the haze depth estimating unit, is to be used for adjusting a parameter to be used in a haze removal process of the one frame. The image processing system may further include a difference absolute value deriving unit that derives a difference absolute value between a haze depth target value of the past frame acquired by the target value acquiring unit and the haze depth estimate value of the one frame derived by the haze depth estimating unit, wherein when the one frame is a frame in which a scene change occurs or when the one frame is not a frame in which a scene change occurs, a reliability of the estimate value is higher than a first threshold, and the difference absolute value is higher than a second threshold, the target value determining unit determines to use a haze depth estimate value of the one frame for adjusting a parameter to be used in a haze removal process of the one frame, and when the one frame is not a frame in which a scene change occurs, and a reliability of the estimate value is lower than the first threshold or the difference absolute value is lower than the second threshold, the target value determining unit may determine to use a haze depth target value of the past frame for adjusting a parameter to be used in a haze removal process of the one frame.

According to a second aspect of the present invention, an image processing system is provided. The image processing system may include a luminance evaluation value deriving unit that derives a luminance evaluation value of an at least partial region of an image. The image processing system may include a saturation evaluation value deriving unit that derives a saturation evaluation value of the at least partial region of the image. The image processing system may include a contrast evaluation value deriving unit that derives a contrast evaluation value of the at least partial region of the image. The image processing system may include a haze depth estimating unit that derives a haze depth estimate value of the image based on the luminance evaluation value, the saturation evaluation value, and the contrast evaluation value.

The image processing system may include a first pixel extracting unit that extracts a non-flat, non-edgy pixel from the image, wherein the haze depth estimating unit may derive the haze depth estimate value based on a luminance evaluation value, a saturation evaluation value and a contrast evaluation value of the non-flat, non-edgy pixels extracted by the first pixel extracting unit.

According to a third aspect of the present invention, an image processing system is provided. The image processing system may include a first pixel extracting unit that extracts a non-flat, non-edgy pixel from an image. Also, the image processing system may include a haze depth estimating unit that derives a haze depth estimate value of the image based on at least two among a luminance evaluation value, a saturation evaluation value and a contrast evaluation value of the non-flat, non-edgy pixels extracted by the first pixel extracting unit.

The luminance evaluation value may be an average luminance value of the region. The saturation evaluation value may be an average saturation value of the region. The contrast evaluation value may be a contrast value of the region. The haze depth estimating unit may derive a higher value for the haze depth estimate value as the average luminance value increases. The haze depth estimating unit may derive a higher value for the haze depth estimate value as the average saturation value decreases. The haze depth estimating unit may derive a higher value for the haze depth estimate value as the contrast value decreases. The image may be a moving image including a plurality of frames, and the image processing system may include: a high saturation pixel extracting unit that extracts, in one frame among the plurality of frames, a high saturation pixel having a saturation higher than a predetermined threshold; a high saturation pixel rate deriving unit that derives a high saturation pixel rate indicative of a percentage of the high saturation pixels in the one frame; and a scene change judging unit that judges whether or not a scene change is included in the image based on different criteria depending on whether or not the high saturation pixel rate is higher than a predetermined threshold. The image processing system may include a reliability deriving unit that derives a reliability of the haze depth estimate value of the one frame based on the high saturation pixel rate in the one frame and the average luminance value of the one frame. The image processing system may include a parameter adjusting unit that adjusts a parameter to be used in a haze removal process on the one frame based on the reliability of the haze depth estimate value of the one frame derived by the reliability deriving unit, and a scene change flag indicative of whether the one frame is a frame in which a scene change occurs.

The image processing system may include: a transmissivity deriving unit that derives a transmissivity corresponding to a haze depth of each plurality of pixels of the image; and a haze removing unit that executes a haze removal process on the image based on the haze depth estimate value and the transmissivity. The image processing system may further include a second pixel extracting unit that extracts a non-flat, non-edgy pixel from the image, wherein the haze removing unit may determine whether or not to execute the haze removal process based on a percentage, in the image, of the non-flat, non-edgy pixels extracted by the second pixel extracting unit.

According to a fourth aspect of the present invention, an image processing system is provided. The image processing system may include a high saturation pixel extracting unit that extracts a high saturation pixel having a saturation higher than a predetermined threshold from one frame among a plurality of frames included in a moving image. The image processing system may include a high saturation pixel rate deriving unit that derives a high saturation pixel rate indicative of a percentage of the high saturation pixels in the one frame. The image processing system may include a scene change judging unit that judges whether or not a scene change is included in the moving image based on different criteria depending on whether or not the high saturation pixel rate in the one frame is higher than a predetermined threshold.

The scene change judging unit may judge whether or not a scene change is included in the moving image based on a hue of the one frame and a hue of a past frame of the one frame when the high saturation pixel rate is higher than the threshold. The scene change judging unit may judge whether or not a scene change is included the moving image based on a high saturation pixel rate of the one frame, and a high saturation pixel rate of a past frame of the one frame when the high saturation pixel rate is equal to or lower than the threshold. The image processing system may include: a haze depth estimate value acquiring unit that acquires a haze depth estimate value of the one frame; and a reliability deriving unit that derive a reliability of the haze depth estimate value based on the high saturation pixel rate in the one frame and an average luminance value of the one frame. The reliability deriving unit may derive a higher reliability as the average luminance value increases, and derive a higher reliability as the high saturation pixel rate decreases when the estimate value is higher than a predetermined threshold. The reliability deriving unit may derive a higher reliability as the average luminance value decreases and derive a higher reliability as the high saturation pixel rate increases when the estimate value is equal to or lower than a predetermined threshold.

The image processing system may include: a target value acquiring unit that acquires a haze depth target value; and a target value determining unit that, based on the reliability derived by the reliability deriving unit, determines which one, the haze depth target value of a past frame of the one frame acquired by the target value acquiring unit or the haze depth estimate value acquired by the haze depth estimate value acquiring unit, is to be used for adjusting a parameter to be used in a haze removal process. The image processing system may include a difference absolute value deriving unit that derives a difference absolute value between a haze depth target value acquired by the target value acquiring unit and the haze depth estimate value acquired by the haze depth estimate value acquiring unit, wherein based on a reliability of the estimate value and the difference absolute value, or a scene change flag indicative of whether the one frame is a frame in which a scene change occurs, the target value determining unit may determine which one, the haze depth target value acquired by the target value acquiring unit or the haze depth estimate value acquired by the haze depth estimate value acquiring unit, is to be used for adjusting a parameter to be used in a haze removal process.

The image processing system may include a parameter adjusting unit that adjusts a parameter to be used in a haze removal process of the one frame such that it becomes close to, stepwise, a value corresponding to the haze depth target value or the haze depth estimate value determined by the target value determining unit. The parameter adjusting unit may adjust a parameter to be used in the haze removal process with an adjustment amount corresponding to a difference absolute value between the haze depth target value or the haze depth estimate value determined by the target value determining unit and a parameter used in a haze removal process of a past frame of the one frame; a reliability of the haze depth estimate value; and a scene change flag indicative of whether the one frame is a frame in which a scene change occurs such that it becomes close to, stepwise, a value corresponding to the haze depth target value or the haze depth estimate value determined by the target value determining unit.

According to a fifth aspect of the present invention, an image processing system is provided. The image processing system may include a haze depth acquiring unit that acquires a haze depth of an image. The image processing system may include a removal processing unit that performs, based on the haze depth, haze removal processes at mutually different degrees of haze removal on a reflectance component of the image and an illumination light component of the image. The image processing system may include a synthesizing unit that synthesizes the reflectance component and the illumination light component on which the haze removal processes have been performed. On an assumption that there is approximately no reflectance components included in airglow, the removal processing unit may use an atmospheric model of a hazed image and the Retinex theory to perform haze removal processes at mutually different degrees of haze removal on the reflectance component of the image and the illumination light component of the image. On a further assumption that the atmospheric model of the hazed image can apply only to the illumination light component, the removal processing unit may use the atmospheric model of the hazed image and the Retinex theory to perform haze removal processes at mutually different degrees of haze removal on the reflectance component of the image and the illumination light component of the image.

According to a sixth aspect of the present invention, a computer-readable recording medium having recorded thereon a program for allowing a computer to function as the image processing systems is provided.

The summary clause does not necessarily describe all necessary features of the embodiments of the present invention. The present invention may also be a sub-combination of the features described above.

BEST MODE FOR CARRYING OUT THE INVENTION

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
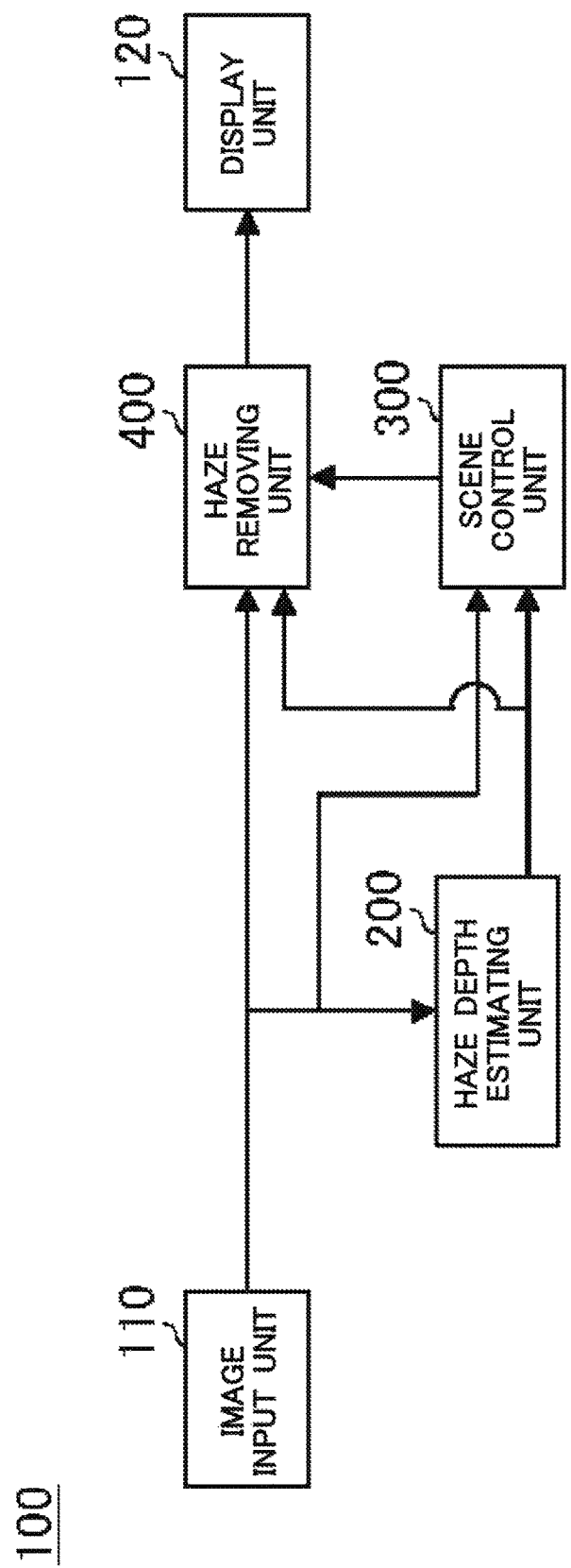
FIG. 1 schematically shows one example of a functional configuration of an image processing system 100.

FIG. 1 schematically shows one example of a functional configuration of an image processing system 100. The image processing system 100 according to the present embodiment may be a display device that removes a haze included in an input image and displays the image. Haze includes atmospheric phenomena in general that make a field of view poor due to microparticles. For example, haze includes fog, mist, smoke, powdery dust, dust, rain, snow, etc. The display device may be a liquid crystal display, a plasma display, an organic EL display, etc.

The image processing system 100 includes an image input unit 110, a display unit 120, a haze depth estimating unit 200, a scene control unit 300 and a haze removing unit 400. The image input unit 110 receives an input of an image. The image may be a moving image or a still image, and also may be a frame included in a moving image. The image input unit 110 may receive an input of RGB data, YUV data or HSV data. The image processing system 100 may convert input YUV data into RGB data.

The haze depth estimating unit 200 derives a haze depth estimate value of each input image. The haze depth of an image is a depth of a haze included in the image. For example, if images of a single space are captured, the haze depth of an image becomes higher when the depth of a fog in the space is high than when the depth of a fog in the space is low.

The scene control unit 300 judges whether or not a scene change is included in an input moving image. Based on whether or not a scene change is included in an input moving image, the scene control unit 300 may generate a parameter to be used in a haze removal process. The haze removing unit 400 removes a haze from an input image. The haze removing unit 400 may use a parameter generated by the scene control unit 300 to remove a haze from an input image.

The display unit 120 displays an image from which a haze is removed by the haze removing unit 400.

For example, the scene control unit 300 generates a parameter to be used in a haze removal process so as to change the strength of haze removal stepwise over a plurality of frames when a scene change is not detected in a moving image. Then, the haze removing unit 400 changes the strength of haze removal stepwise over a plurality of frames using a parameter generated by the scene control unit 300 when a scene change is not detected in a moving image. Thereby, it is possible to prevent an image from changing rapidly due to haze removal, and to suppress occurrences of a phenomenon like so-called flickering.

Also, for example, the scene control unit 300 generates a parameter to be used in a haze removal process so as to change the strength of haze removal stepwise over a smaller number of frames when a scene change is detected in a moving image than when a scene change is not detected in a moving image. Then, the haze removing unit 400 changes the strength of haze removal stepwise over a smaller number of frames using a parameter generated by the scene control unit 300 when a scene change is detected in a moving image than when a scene change is not detected in a moving image.

The image processing system 100 may not include the scene control unit 300. In this case, the haze removing unit 400 removes a haze from an input image based on a haze depth estimate value of an image derived by the haze depth estimating unit 200. Thereby, it is possible to realize a highly precise haze removal process based on a haze depth estimated by the haze depth estimating unit 200.

Figure 2:
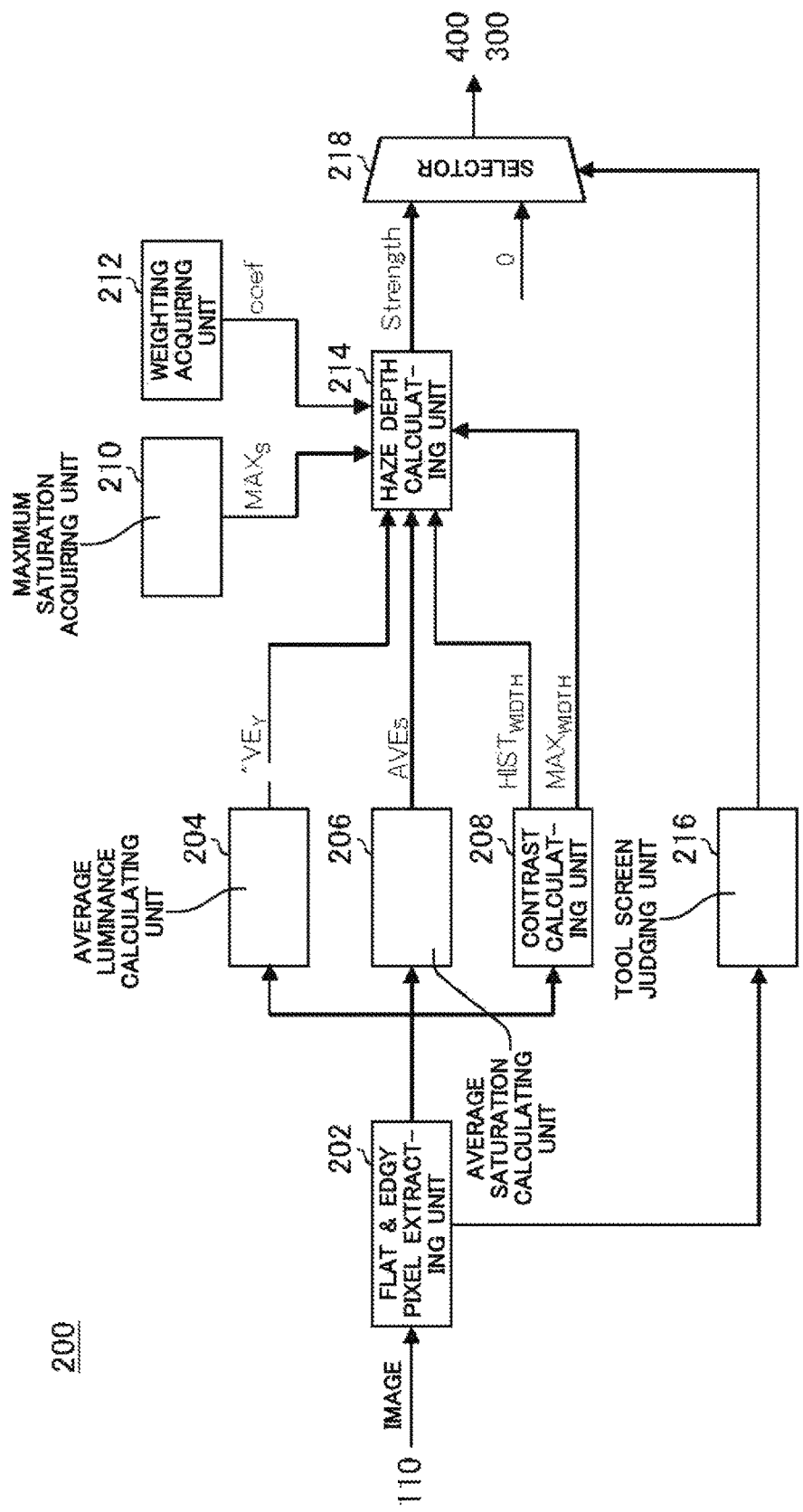
FIG. 2 schematically shows one example of a functional configuration of a haze depth estimating unit 200.

FIG. 2 schematically shows one example of a functional configuration of the haze depth estimating unit 200. The haze depth estimating unit 200 includes a flat & edgy pixel extracting unit 202, an average luminance calculating unit 204, an average saturation calculating unit 206, a contrast calculating unit 208, a maximum saturation acquiring unit 210, a weighting acquiring unit 212, a haze depth calculating unit 214, a tool screen judging unit 216 and a selector 218.

The flat & edgy pixel extracting unit 202 extracts a non-flat, non-edgy pixel from an image input through the image input unit 110. The flat & edgy pixel extracting unit 202, for example, extracts a flat or edgy pixel from an image to exclude the extracted pixel from the image, thereby extracting a non-flat, non-edgy pixel. The flat & edgy pixel extracting unit 202 may be one example of a first pixel extracting unit.

The average luminance calculating unit 204 calculates an average luminance value (referred to as $AVE_Y$ in some cases) of non-flat, non-edgy pixels. The average luminance value may be one example of a luminance evaluation value. The average luminance calculating unit 204 may be one example of a luminance evaluation value deriving unit.

The average saturation calculating unit 206 calculates an average saturation value (referred to as $AVE_S$ in some cases) of non-flat, non-edgy pixels. The average saturation value may be one example of a saturation evaluation value. The average saturation calculating unit 206 may be one example of a saturation evaluation value deriving unit.

The contrast calculating unit 208 calculates a contrast value of non-flat, non-edgy pixels. The contrast value may be one example of a contrast evaluation value. The contrast calculating unit 208 may be one example of a contrast evaluation value deriving unit.

The contrast calculating unit 208 may generate a histogram of non-flat, non-edgy pixels. The contrast calculating unit 208 may generate a histogram with any bin count. Then, the contrast calculating unit 208 may subtract the minimum value of the generated histogram from its maximum value to calculate a histogram width (referred to as $HIST_{WIDTH}$ in some cases). In this case, from among a plurality of bins, the contrast calculating unit 208 may subtract the minimum value of bins, values of which are higher than a threshold, from their corresponding maximum value.

$HIST_{WIDTH}$ may be one example of a contrast value. The contrast calculating unit 208 may output the bin count of a histogram as a maximum width (referred to as $MAX_{WIDTH}$ in some cases) of the histogram.

The maximum saturation acquiring unit 210 acquires a maximum saturation (referred to as $MAX_S$ in some cases) in the image processing system 100. The weighting acquiring unit 212 acquires a weight value (referred to as coef in some cases) to be used in calculating a haze depth of an image. The weighting acquiring unit 212, for example, acquires coef specified by a manufacturer or a user of the image processing system 100.

The haze depth calculating unit 214 calculates a haze depth estimate value (referred to as Strength in some cases) of an image. The haze depth calculating unit 214 may calculate Strength based on a luminance evaluation value, a saturation evaluation value and a contrast evaluation value of non-flat, non-edgy pixels.

The haze depth calculating unit 214 may calculate Strength based on: an average luminance value calculated by the average luminance calculating unit 204; an average saturation value calculated by the average saturation calculating unit 206; and a contrast value calculated by the contrast calculating unit 208. The haze depth calculating unit 214 may calculate Strength by multiplying an average luminance value, an average saturation value and a contrast value. The haze depth calculating unit 214 may multiply an average saturation value, a value obtained by subtracting the average saturation value from a maximum saturation, and a value obtained by subtracting a contrast value from the maximum width of a histogram.

In this case, the haze depth calculating unit 214 may weight an average luminance value. For example, the haze depth calculating unit 214 may weight an average luminance value such that its value increases further as the value increases and its value decreases further as the value decreases. Also, the haze depth calculating unit 214 may weight an average saturation value. For example, the haze depth calculating unit 214 may weight an average saturation value such that its value increases further as the value increases and its value decreases further as the value decreases.

The haze depth calculating unit 214, for example, calculates Strength using Equation 1.

$$\text{Strength} = \text{coef} \times (MAX_{WIDTH} - HIST_{WIDTH} + 1) \times (AVE_Y + 1) \times (MAX_S + AVE_S + 1) \quad [\text{Equation 1}]$$

Thereby, the haze depth calculating unit 214 can derive a higher value for a haze depth estimate value as an average luminance value increases, can derive a higher value for a haze depth estimate value as an average saturation value decreases, and can derive a higher value for a haze depth estimate value as a contrast value decreases. Since it can be presumed that when the haze depth of an image is high, the contrast of the image is low, the average luminance is high and the average saturation is low, the haze depth calculating unit 214 can calculate a more highly precise haze depth estimate value reflecting features of a haze.

The tool screen judging unit 216 judges whether or not an input image is a tool screen. The tool screen is, for example, a screen for setting a display parameter of the display unit 120, a screen for setting a display parameter of an image, or the like.

For example, if while the display unit 120 is displaying a monitoring camera moving image, a haze is generated in the monitoring camera moving image, a haze removal process is desirably executed by the haze removing unit 400. On the other hand, if while the display unit 120 is displaying a monitoring camera moving image, a viewer of the monitoring camera moving image causes the display unit 120 to display a tool screen in order to change the setting of a display parameter, execution of a haze removal process on the tool screen may result in an unnecessarily dark screen or flickering of the screen in some cases.

To cope with this, the haze depth estimating unit 200 according to the present embodiment performs control such that 0 is output as a haze depth estimate value when an input image is judged as a tool screen, and Strength calculated by the haze depth calculating unit 214 is output when an input image is not judged as a tool screen.

Specifically, the selector 218: receives Strength calculated by the haze depth calculating unit 214 and a tool screen judgement result made by the tool screen judging unit 216; when an input image is not a tool screen, outputs Strength to the scene control unit 300 or the haze removing unit 400; and when an input image is a tool screen, outputs 0 to the scene control unit 300 or the haze removing unit 400. Thereby, the haze removing unit 400 can distinguish that an input image is a tool screen. When an input image is a tool screen, the haze removing unit 400 may determine not to execute a haze removal process. The haze depth estimating unit 200 may output a low estimate value, instead of outputting 0. For example, the haze depth estimating unit 200 outputs an estimate value which is lower than the minimum value of Strength calculated by the haze depth calculating unit 214.

The tool screen judging unit 216 may judge whether or not an input image is a tool screen based on a non-flat, non-edgy pixel extracted by the flat & edgy pixel extracting unit 202. Here, according to a second criterion different from a first criterion for extracting a non-flat, non-edgy pixel output to the average luminance calculating unit 204, the average saturation calculating unit 206 and the contrast calculating unit 208, the flat & edgy pixel extracting unit 202 may extract a non-flat, non-edgy pixel to be output to the tool screen judging unit 216. The second criterion may be a criterion that makes it harder for a pixel to be judged as a non-flat, non-edgy pixel as compared with the first criterion. The flat & edgy pixel extracting unit 202 may be one example of a second pixel extracting unit.

The tool screen judging unit 216 may judge an input image not as a tool screen when a percentage of non-flat, non-edgy pixels received from the flat & edgy pixel extracting unit 202 relative to all the pixels of the image is equal to or lower than a predetermined threshold, and may judge the image as a tool screen when the percentage is higher than the predetermined threshold.

Also, the tool screen judging unit 216 may judge an image as a tool screen when a percentage of flat or edgy pixels extracted according to the second criterion relative to flat or edgy pixels extracted according to the first criterion is equal to or lower than a predetermined threshold, and may judge the image not as a tool screen when the percentage is higher than the predetermined threshold.

The tool screen judging unit 216 allows a judgement not only on a tool screen but also on another type of screens as long as such a screen has a low percentage of non-flat, non-edgy pixels in an input image. For example, the tool screen judging unit 216 allows a judgement whether or not an input image is an image having a high percentage of regions other than image displaying regions relative to the entire display region of the display unit 120. The tool screen judging unit 216 may be one example of a haze removal process target judging unit that judges whether or not an input image is a target on which a haze removal process is to be executed.

Although an example in which the average luminance calculating unit 204, the average saturation calculating unit 206 and the contrast calculating unit 208 calculate an average luminance value, an average saturation value and a contrast value of non-flat, non-edgy pixels has been explained here, this is not the sole example. The average luminance calculating unit 204, the average saturation calculating unit 206, and the contrast calculating unit 208 may calculate an average luminance value, average saturation value and contrast value of an entire input image. Also, the average luminance calculating unit 204, the average saturation calculating unit 206, and the contrast calculating unit 208 may calculate an average luminance value, average saturation value and contrast value of part of an input image.

Figure 3:
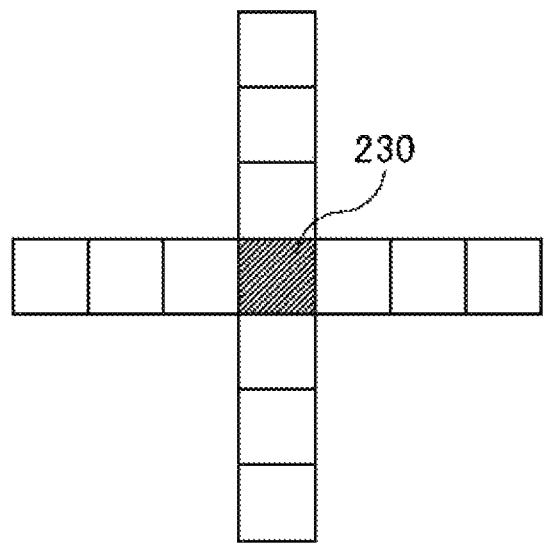
FIG. 3 is a figure for explaining a flat & edgy pixel extraction process.

FIG. 3 is a figure for explaining one example of a flat & edgy pixel extraction process. When judging whether or not a pixel of interest 230 is flat or edgy, the flat & edgy pixel extracting unit 202 first acquires: the maximum value and minimum value of pixel values of seven pixels including the pixel of interest 230 and six other pixels that are arranged vertically and sandwich the pixel of interest 230 as their center; and the maximum value and minimum value of seven pixels including the pixel of interest 230 and six other pixels that are arranged horizontally and sandwich the pixel of interest 230 as their center.

Next, the flat & edgy pixel extracting unit 202 calculates a value obtained by subtracting the minimum value from the maximum value for each set of the seven pixels arranged in the vertical direction and the seven pixels arranged in the horizontal direction. Then, in at least one of the vertical direction and the horizontal direction, when the value obtained by subtracting the minimum value from the maximum value is equal to or lower than a first threshold, and when the value is equal to or higher than a second threshold higher than the first threshold, the flat & edgy pixel extracting unit 202 judges the pixel of interest 230 as a flat or edgy pixel.

The pixel count in the vertical direction and the pixel count in the horizontal direction may be a pixel count other than seven pixels. Also, when a flat or edgy pixel is extracted according to the first criterion, the flat & edgy pixel extracting unit 202 may use the first threshold and the second threshold, and when a flat or edgy pixel is extracted according to the second criterion, the flat & edgy pixel extracting unit 202 may use a third threshold higher than the first threshold and lower than the second threshold, and a fourth threshold higher than the third threshold and lower than the second threshold.

Figure 4A:
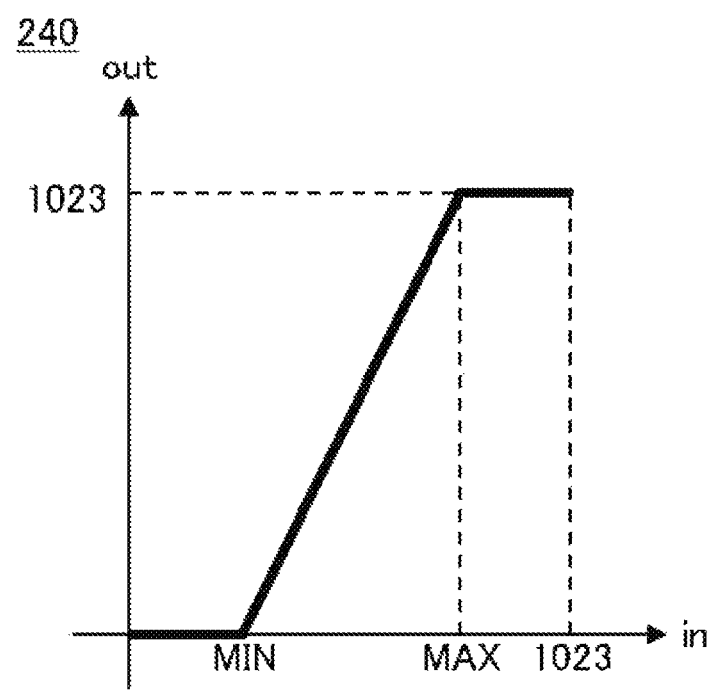
FIG. 4A schematically shows one example of a weighting graph 240.
Figure 4B:
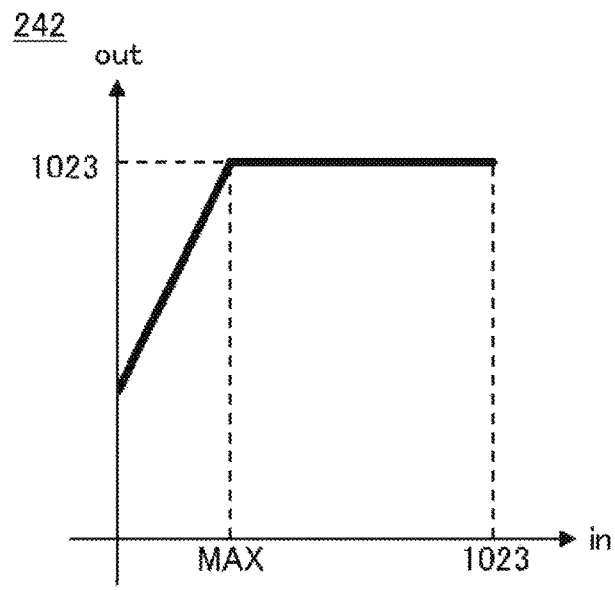
FIG. 4B schematically shows one example of a weighting graph 242.

FIG. 4A schematically shows one example of a weighting graph 240. Also, FIG. 4B schematically shows one example of a weighting graph 242. The weighting graph 240 shows one example of weight values to be used by the haze depth calculating unit 214 in weighting an average luminance value. FIG. 4A and FIG. 4B illustrate examples where an input signal is 10 bits. By weighting an average luminance value according to the weighting graph 240, the haze depth calculating unit 214 can perform weighting such that the average luminance value increases further as its value increases, and the average luminance value decreases further as its value decreases.

The haze depth calculating unit 214 may use the weighting graph 240 also in weighting an average saturation value. The haze depth calculating unit 214 may use the weighting graph 240 having the same values or may use the weighting graph 240 having different values in weighting an average luminance value and in weighting an average saturation value. For example, when weighting an average luminance value more than an average saturation value, the haze depth calculating unit 214 may use the weighting graph 242 that indicates more weighting as shown in the weighting graph 242 to weight the average luminance value.

Figure 5:
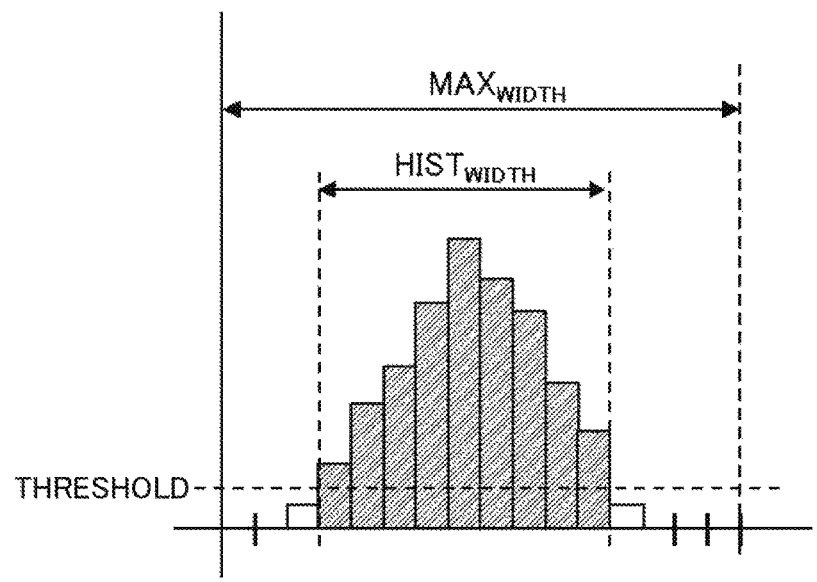
FIG. 5 is a figure for explaining histogram values.

FIG. 5 is a figure for explaining histogram values. FIG. 5 illustrates a case where the bin count of a histogram is 16. As shown in FIG. 5, from among a plurality of bins, the contrast calculating unit 208 may calculate $HIST_{WIDTH}$ by subtracting the minimum value of bins, values of which are higher than a threshold, from their corresponding maximum value.

Figure 6:
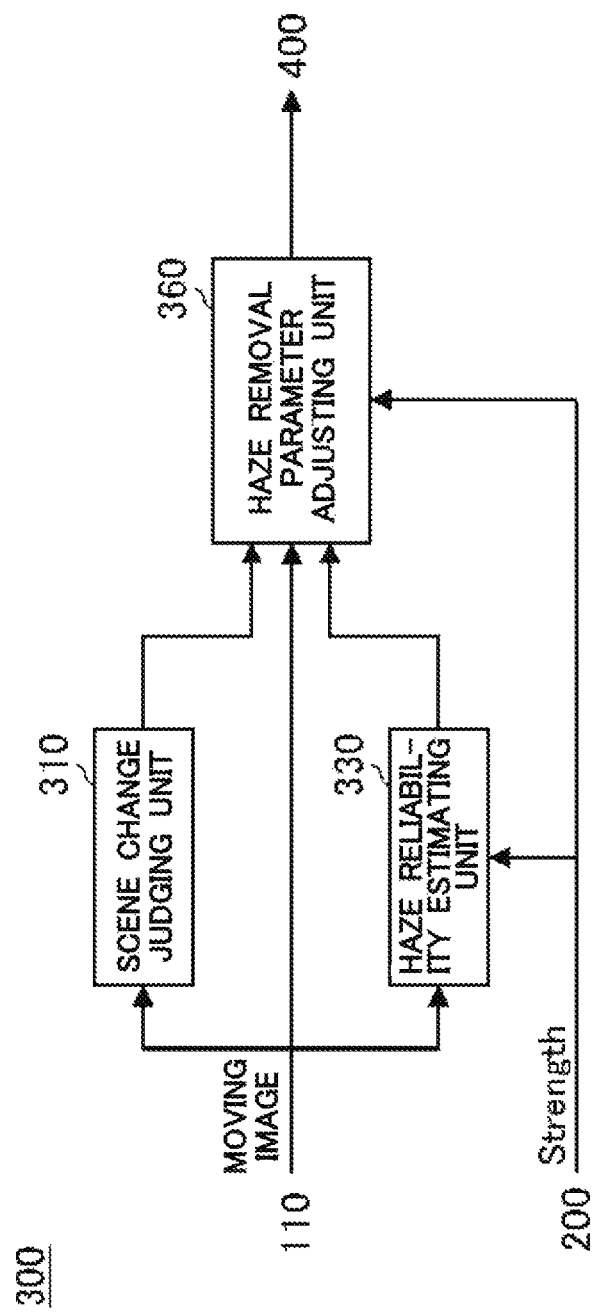
FIG. 6 schematically shows one example of a functional configuration of a scene control unit 300.

FIG. 6 schematically shows one example of a functional configuration of the scene control unit 300. The scene control unit 300 includes a scene change judging unit 310, a haze reliability estimating unit 330 and a haze removal parameter adjusting unit 360.

The scene change judging unit 310 judges whether or not a scene change is included in a moving image input through the image input unit 110. The scene change judging unit 310 may associate, with each frame among a plurality of frames included in the moving image, a scene change flag indicative of whether or not a scene changes occurs therein.

The haze reliability estimating unit 330 estimates the reliability of Strength output from the haze depth estimating unit 200 for a frame included in a moving image input through the image input unit 110.

The haze removal parameter adjusting unit 360 adjusts a parameter to be used in a haze removal process on a plurality of frames included in a moving image to output the parameter to the haze removing unit 400. The haze removal parameter adjusting unit 360 may adjust a parameter to be used in a haze removal process on one frame based on a relationship between the one frame and a past frame of the one frame. Based on the reliability estimated by the haze reliability estimating unit 330 and the scene change flag generated by the scene change judging unit 310, the haze removal parameter adjusting unit 360 may adjust a parameter to be used in a haze removal process on a plurality of frames included in the moving image to output the parameter to the haze removing unit 400.

Figure 7:
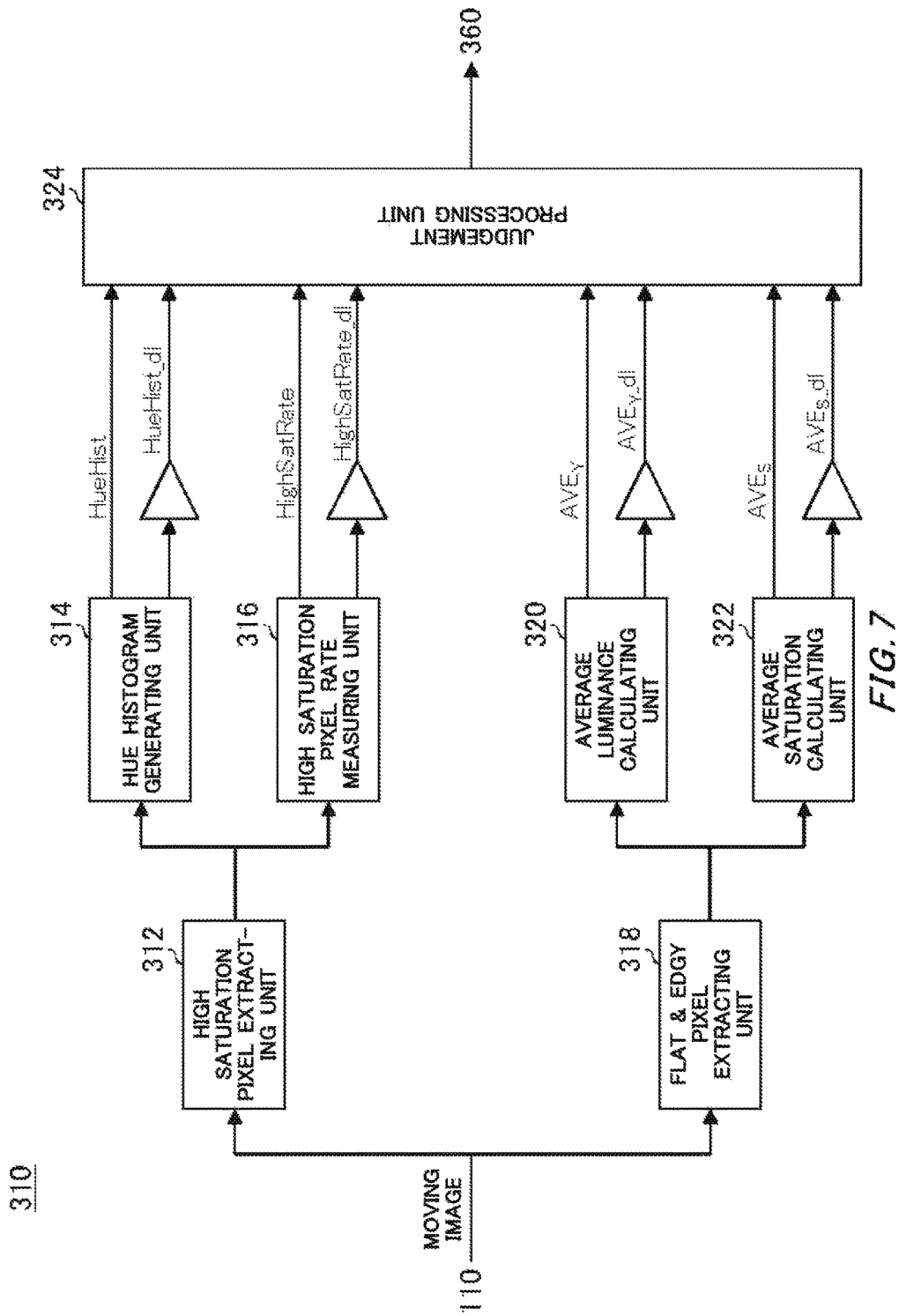
FIG. 7 schematically shows one example of a functional configuration of a scene change judging unit 310.

FIG. 7 schematically shows one example of a functional configuration of the scene change judging unit 310. The scene change judging unit 310 includes a high saturation pixel extracting unit 312, a hue histogram generating unit 314, a high saturation pixel rate measuring unit 316, a flat & edgy pixel extracting unit 318, an average luminance calculating unit 320, an average saturation calculating unit 322 and a judgement processing unit 324.

The high saturation pixel extracting unit 312 extracts a high saturation pixel from one frame among a plurality of frames included in a moving image input through the image input unit 110. The high saturation pixel may be a pixel having a saturation higher than a predetermined threshold. When having received RGB data, the high saturation pixel extracting unit 312 may extract, from respective pixels included in a frame, a pixel in which a difference between the maximum value and minimum value of an R component, a G component and a B component is equal to or higher than a predetermined threshold, as a high saturation pixel. Also, when having received HSV data, the high saturation pixel extracting unit 312 may extract, from respective pixels included in a frame, a pixel having an S component which is equal to or higher than a predetermined threshold, as a high saturation pixel.

The hue histogram generating unit 314 generates a hue histogram (referred to as HueHIST in some cases), for high saturation pixels extracted by the high saturation pixel extracting unit 312. Although an example in which the hue histogram generating unit 314 generates HueHIST for high saturation pixels extracted by the high saturation pixel extracting unit 312 has been explained here, this is not the sole example. The hue histogram generating unit 314 may generate HueHIST for a frame included in a moving image input through the image input unit 110.

The high saturation pixel rate measuring unit 316 measures a high saturation pixel rate (referred to as HighSatRate in some cases) indicative of a percentage of high saturation pixels in one frame. The high saturation pixel rate measuring unit 316 may treat, as HighSatRate, a percentage of high saturation pixels relative to all the pixels of one frame. The high saturation pixel rate measuring unit 316 may be one example of a high saturation pixel rate deriving unit that derives a high saturation pixel rate in one frame.

The flat & edgy pixel extracting unit 318 extracts a non-flat, non-edgy pixel from one frame among a plurality of frames included in a moving image input through the image input unit 110. The flat & edgy pixel extracting unit 318 may extract a non-flat, non-edgy pixel in a similar manner to that of the flat & edgy pixel extracting unit 202. In this case, the flat & edgy pixel extracting unit 318 may extract a non-flat, non-edgy pixel according to the first criterion, may extract a non-flat, non-edgy pixel according to the second criterion, or may extract a non-flat, non-edgy pixel according to another criterion.

The average luminance calculating unit 320 calculates $AVE_Y$ of non-flat, non-edgy pixels extracted by the flat & edgy pixel extracting unit 318. Although an example in which the average luminance calculating unit 320 calculates $AVE_Y$ of non-flat, non-edgy pixels extracted by the flat & edgy pixel extracting unit 318 has been explained here, this is not the sole example. The average luminance calculating unit 320 may calculate $AVE_Y$ for a frame included in a moving image input through the image input unit 110.

The average saturation calculating unit 322 calculates $AVE_S$ of non-flat, non-edgy pixels extracted by the flat & edgy pixel extracting unit 318. Although an example in which the average saturation calculating unit 322 calculates $AVE_S$ of non-flat, non-edgy pixels extracted by the flat & edgy pixel extracting unit 318 has been explained here, this is not the sole example. The average saturation calculating unit 322 may calculate $AVE_S$ for a frame included in a moving image input through the image input unit 110.

The judgement processing unit 324 executes a judgement process of judging whether or not a scene change is included in a moving image input through the image input unit 110. The judgement processing unit 324 generates a scene change flag indicative of whether a frame is a frame in which a scene change occurs to output the scene change flag to the haze removal parameter adjusting unit 360.

The judgement processing unit 324 may judge whether or not a scene change is included in a moving image based on different criteria depending on whether or not a high saturation pixel rate measured by the high saturation pixel rate measuring unit 316 is higher than a predetermined threshold.

The judgement processing unit 324 may judge whether or not a scene change is included in a moving image based on the hue of one frame and the hue of a past frame of the one frame when the high saturation pixel rate of the one frame measured by the high saturation pixel rate measuring unit 316 is higher than a predetermined threshold. The past frame of the one frame is, for example, a frame before the one frame.

Specifically, the judgement processing unit 324 may judge whether or not a scene change is included in a moving image based on SAD (Sum of Absolute Difference) (referred to as HueHISTSAD in some cases) of HueHIST of the one frame generated by the hue histogram generating unit 314 and a hue histogram of a past frame of the one frame (referred to as HueHIST_dl in some cases).

For example, the judgement processing unit 324 judges that the one frame is not a frame in which a scene change occurs when: HueHISTSAD is lower than a fifth threshold; a difference absolute value between $AVE_Y$ of the one frame and an average luminance value of a past frame of the one frame (referred to as $AVE_Y$_dl in some cases) is lower than a sixth threshold; and a difference absolute value between $AVE_S$ of the one frame and an average saturation value of a past frame of the one frame (referred to as $AVE_S$_dl in some cases) is lower than a seventh threshold. In other cases, the judgement processing unit 324 judges that the one frame is a frame in which a scene change occurs. When having judged that the one frame is not a frame in which a scene change occurs, the judgement processing unit 324 may set a scene change flag of the one frame to False. When having judged that the one frame is a frame in which a scene change occurs, the judgement processing unit 324 may set a scene change flag of the one frame to True.

The judgement processing unit 324 may judge whether or not a scene change is included in a moving image based on HighSatRate of one frame and a high saturation pixel rate of a past frame of the one frame (referred to as HighSatRate_dl in some cases) when a high saturation pixel rate of the one frame measured by the high saturation pixel rate measuring unit 316 is equal to or lower than a predetermined threshold.

For example, the judgement processing unit 324 judges that the one frame is not a frame in which a scene change occurs when: a difference absolute value between HighSatRate and HighSatRate_dl is lower than an eighth threshold; a difference absolute value between $AVE_Y$ and $AVE_Y$_dl is lower than the sixth threshold; and a difference absolute value between $AVE_S$ and $AVE_S$_dl is lower than the seventh threshold. In other cases, the judgement processing unit 324 judges that the one frame is a frame in which a scene change occurs.

Figure 8:
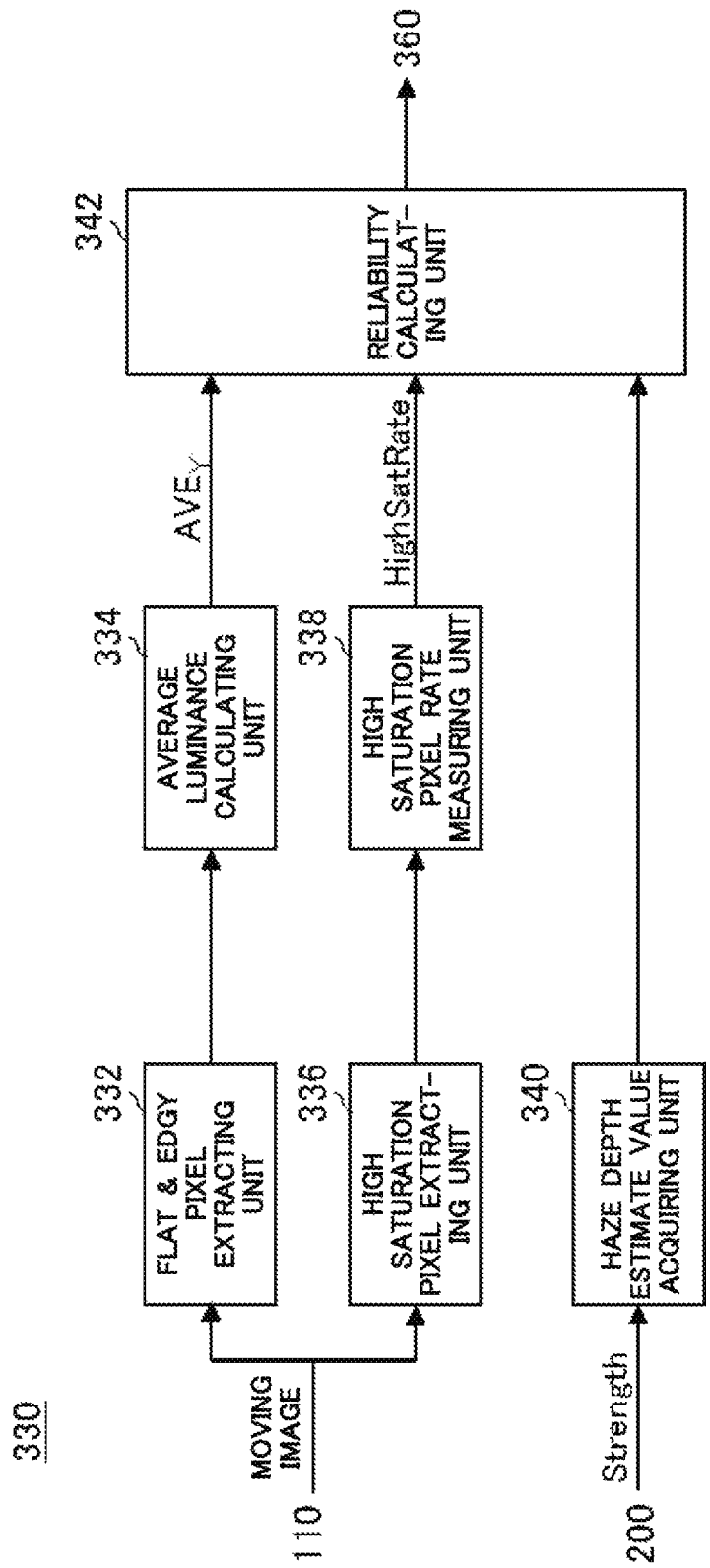
FIG. 8 schematically shows one example of a functional configuration of a haze reliability estimating unit 330.

FIG. 8 schematically shows one example of a functional configuration of the haze reliability estimating unit 330. The haze reliability estimating unit 330 includes a flat & edgy pixel extracting unit 332, an average luminance calculating unit 334, a high saturation pixel extracting unit 336, a high saturation pixel rate measuring unit 338, a haze depth estimate value acquiring unit 340 and a reliability calculating unit 342.

The flat & edgy pixel extracting unit 332 extracts a non-flat, non-edgy pixel from one frame among a plurality of frames included in a moving image input through the image input unit 110. The flat & edgy pixel extracting unit 332 may extract a non-flat, non-edgy pixel in a similar manner to that of the flat & edgy pixel extracting unit 202. In this case, the flat & edgy pixel extracting unit 332 may extract a non-flat, non-edgy pixel according to the first criterion, may extract a non-flat, non-edgy pixel according to the second criterion, or may extract a non-flat, non-edgy pixel according to another criterion.

The average luminance calculating unit 334 calculates $AVE_Y$ of non-flat, non-edgy pixels extracted by the flat & edgy pixel extracting unit 332. Although an example in which the average luminance calculating unit 334 calculates $AVE_Y$ of non-flat, non-edgy pixels extracted by the flat & edgy pixel extracting unit 332 has been explained here, this is not the sole example. The average luminance calculating unit 334 may calculate $AVE_Y$ for a frame included in a moving image input through the image input unit 110.

The high saturation pixel extracting unit 336 extracts a high saturation pixel from one frame among a plurality of frames included in a moving image input through the image input unit 110. The high saturation pixel extracting unit 336 may extract, from respective pixels included in a frame, a pixel in which a difference between the maximum value and minimum value of an R component, a G component and a B component is equal to or higher than a predetermined threshold as a high saturation pixel.

The high saturation pixel rate measuring unit 338 measures HighSatRate in one frame. The haze depth estimate value acquiring unit 340 acquires Strength output by the haze depth estimating unit 200.

Based on $AVE_Y$ calculated by the average luminance calculating unit 334 and HighSatRate measured by the high saturation pixel rate measuring unit 338, the reliability calculating unit 342 calculates the reliability of Strength acquired by the haze depth estimate value acquiring unit 340 to output the reliability to the haze removal parameter adjusting unit 360. The reliability calculating unit 342 may be one example of a reliability deriving unit that derives the reliability of Strength based on $AVE_Y$ and HighSatRate. The reliability calculating unit 342 may calculate the reliability of Strength based on different criteria depending on whether or not Strength acquired by the haze depth estimate value acquiring unit 340 is higher than a predetermined threshold.

The reliability calculating unit 342 may calculate a higher reliability as $AVE_Y$ increases and calculate a higher reliability as HighSatRate decreases when Strength acquired by the haze depth estimate value acquiring unit 340 is higher than a predetermined threshold. Also, the reliability calculating unit 342 may calculate a higher reliability as $AVE_Y$ decreases and calculate a higher reliability as HighSatRate increases when Strength acquired by the haze depth estimate value acquiring unit 340 is equal to or lower than a predetermined threshold.

In a specific example of a process of calculating a reliability, first, the reliability calculating unit 342 weights respectively Strength acquired by the haze depth estimate value acquiring unit 340, $AVE_Y$ calculated by the average luminance calculating unit 334 and HighSatRate measured by the high saturation pixel rate measuring unit 338.

The reliability calculating unit 342, for example, weights Strength and HighSatRate such that their values increase further as the values increase and their values decrease further as the values decrease. Also, the reliability calculating unit 342, for example, weights $AVE_Y$ such that its value decreases further as the value increases and its value increases further as the value decreases. Weighted Strength may be referred to as StrengthWeight in some cases. Weighted $AVE_Y$ may be referred to as $AVE_Y$Weight in some cases. Weighted HighSatRate may be referred to as HighSatRateWeight in some cases.

Next, the reliability calculating unit 342 treats a larger one of $AVE_Y$Weight and HighSatRateWeight as EvalMax. Then, the reliability calculating unit 342 calculates a difference absolute value between EvalMax and StrengthWeight as the reliability of a haze depth estimate value.

Figure 9:
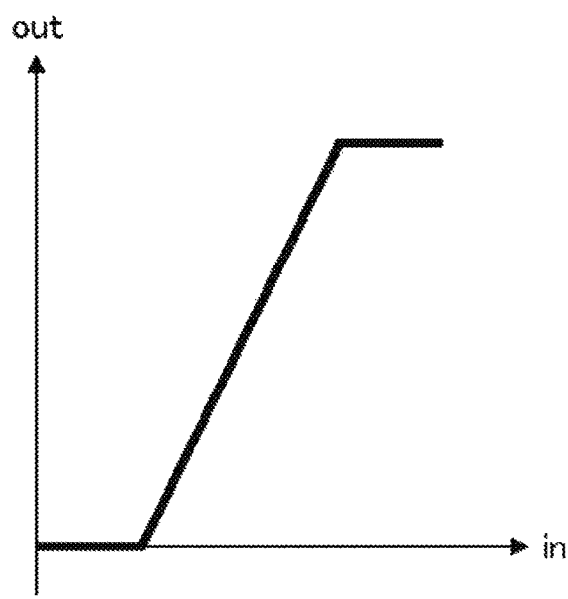
FIG. 9 schematically shows one example of a weighting graph 352.

FIG. 9 schematically shows one example of a weighting graph 352. The weighting graph 352 shows one example of weight values to be used by the reliability calculating unit 342 in weighting Strength. By weighting Strength according to the weighting graph 352, the reliability calculating unit 342 can perform weighting such that Strength increases further as its value increases, and Strength decreases further as its value decreases. The weighting graph 352 may be used by the reliability calculating unit 342 in weighting HighSatRate.

Figure 10:
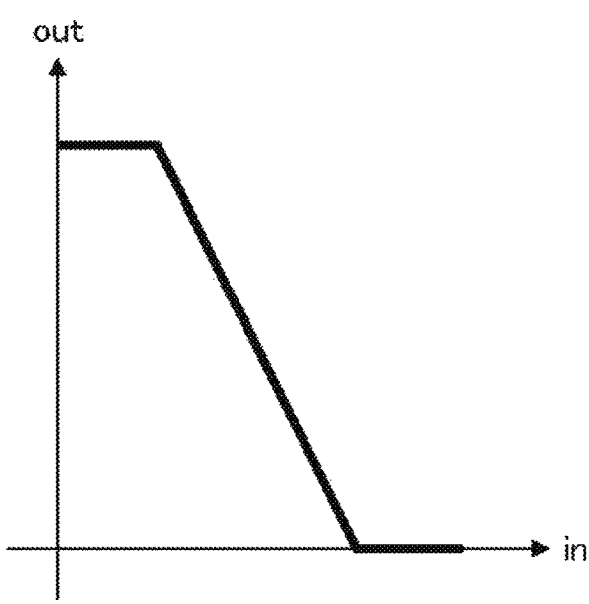
FIG. 10 schematically shows one example of a weighting graph 354.

FIG. 10 schematically shows one example of a weighting graph 354. The weighting graph 354 shows one example of weight values to be used by the reliability calculating unit 342 in weighting $AVE_Y$. By weighting $AVE_Y$ according to the weighting graph 354, the reliability calculating unit 342 can perform weighting such that $AVE_Y$ decreases further as its value increases, and $AVE_Y$ increases further as its value decreases.

Figure 11:
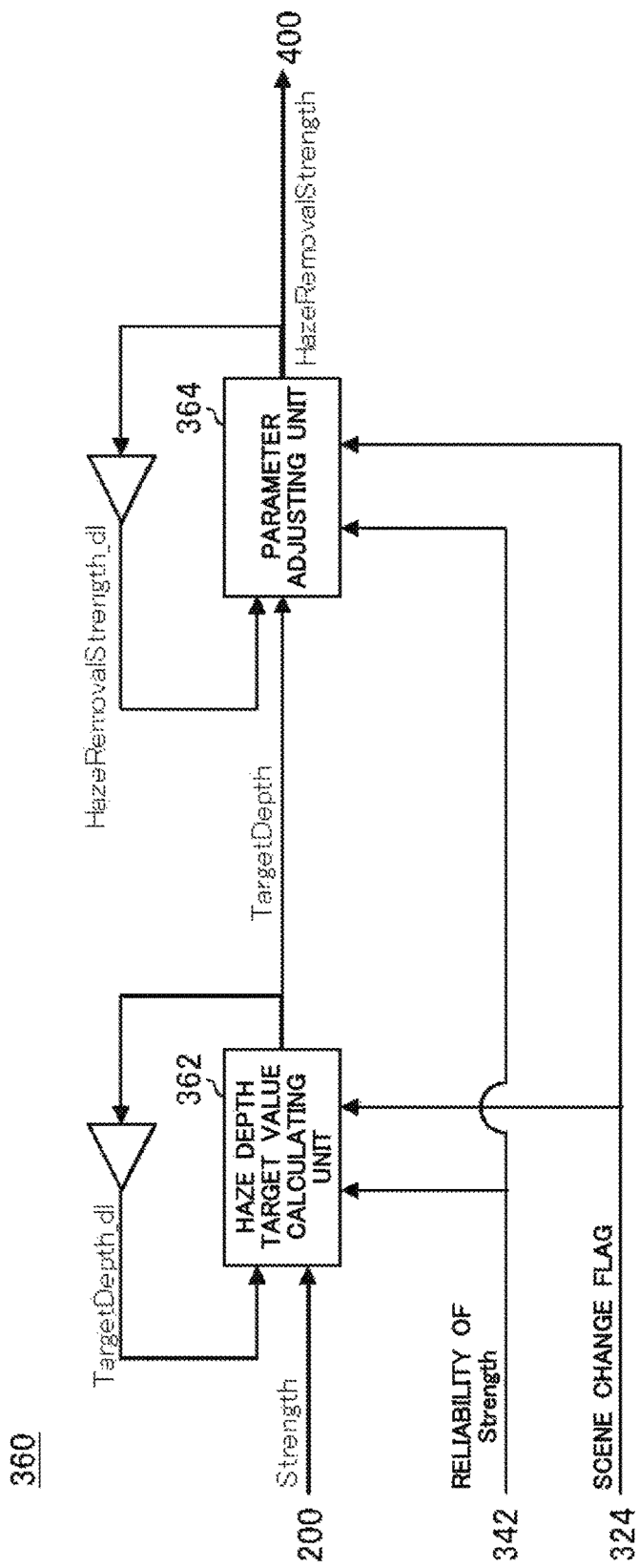
FIG. 11 schematically shows one example of a functional configuration of a haze removal parameter adjusting unit 360.

FIG. 11 schematically shows one example of a functional configuration of the haze removal parameter adjusting unit 360. The haze removal parameter adjusting unit 360 includes a haze depth target value calculating unit 362 and a parameter adjusting unit 364.

The haze depth target value calculating unit 362 calculates a haze depth target value (referred to as TargetDepth in some cases) for one frame. TargetDepth is indicative of a haze removal parameter at which a haze depth should converge when contents of one frame and a plurality of frames following the one frame do not change.

The haze depth target value calculating unit 362 may use TargetDepth set at the time of a past frame of one frame (referred to as TargetDepth_dl in some cases) as TargetDepth of the one frame when the haze reliability estimating unit 330 judges that in the one frame, a haze depth estimate value of the one frame is not reliable. The haze reliability estimating unit 330, for example, judges that a haze depth estimate value of one frame is not reliable when the reliability of the estimate value is lower than a predetermined threshold.

The haze depth target value calculating unit 362 may determine TargetDepth of the one frame based on: TargetDepth of a past frame of the one frame (TargetDepth_dl); Strength for the one frame received from the haze depth estimating unit 200; the reliability of Strength received from the reliability calculating unit 342; and a scene change flag for the one frame received from the judgement processing unit 324.

For example, first, the haze depth target value calculating unit 362 calculates a difference absolute value (referred to as DiffDepth in some cases) between Strength and TargetDepth_dl. Then, the haze depth target value calculating unit 362 uses Strength as TargetDepth when DiffDepth is higher than a ninth threshold and the reliability of Strength is higher than a tenth threshold, and when the scene change flag is True. In other cases, the haze depth target value calculating unit 362 uses TargetDepth_dl as TargetDepth. Such other cases may be a case where a scene change flag is set to False, and DiffDepth is lower than the ninth threshold, or the reliability of Strength is lower than the tenth threshold.

The parameter adjusting unit 364 adjusts a parameter to be used in a haze removal process of one frame (referred to as HazeRemovalStrength in some cases) such that it becomes close to, stepwise, a value corresponding to Strength or TargetDepth_dl determined as TargetDepth of the one frame by the haze depth target value calculating unit 362. Thereby, the strength of haze removal can be changed stepwise over a plurality of frames.

The parameter adjusting unit 364 may adjust HazeRemovalStrength based on TargetDepth determined by the haze depth target value calculating unit 362 and a relationship between the one frame and a past frame of the one frame. The parameter adjusting unit 364 may adjust HazeRemovalStrength such that the parameter adjusted in a past frame of the one frame becomes close to, stepwise, TargetDepth determined by the haze depth target value calculating unit 362. The parameter adjusting unit 364 may change the step-widths at which HazeRemovalStrength becomes close to, stepwise, TargetDepth based on whether or not the one frame is a frame in which a scene change occurs. For example, the parameter adjusting unit 364 increases the step-widths at which HazeRemovalStrength becomes close to, stepwise, TargetDepth when a scene change flag is set to True, that is, when it is judged by the scene change judging unit 310 that the one frame is a frame in which a scene change occurs. Thereby, the strength of haze removal can be increased in the case where the one frame is a frame in which a scene change occurs as compared with the case where the one frame is not a frame in which a scene change occurs.

The parameter adjusting unit 364 may calculate a difference absolute value (referred to as DiffStrength in some cases) between TargetDepth determined by the haze depth target value calculating unit 362 and a parameter (referred to as HazeRemovalStrength_dl in some cases) used in a haze removal process of a past frame of the one frame. The parameter adjusting unit 364 may be one example of a difference absolute value deriving unit that derives DiffStrength. Then, the parameter adjusting unit 364 may adjust HazeRemovalStrength with an adjustment amount corresponding to: DiffStrength; the reliability of Strength; and a scene change flag such that it becomes close to, stepwise, a value corresponding to Strength or TargetDepth_dl determined as TargetDepth of the one frame by the haze depth target value calculating unit 362.

For example, when the scene change flag is True, the parameter adjusting unit 364 adjusts HazeRemovalStrength with a first adjustment amount such that it becomes close to, stepwise, a value corresponding to Strength or TargetDepth_dl determined as TargetDepth of the one frame by the haze depth target value calculating unit 362. Also, when the scene change flag is False, DiffStrength is higher than an eleventh threshold, and the reliability of Strength is higher than a twelfth threshold, the parameter adjusting unit 364 adjusts HazeRemovalStrength with a second adjustment amount such that it becomes close to, stepwise, a value corresponding to Strength or TargetDepth_dl determined as TargetDepth of the one frame. Also, in other cases, the parameter adjusting unit 364 adjusts HazeRemovalStrength with a third adjustment amount such that it becomes close to, stepwise, a value corresponding to Strength or TargetDepth_dl determined as TargetDepth of the one frame. Such other cases may be a case where a scene change flag is set to False, and DiffStrength is lower than the eleventh threshold, or the reliability of Strength is lower than the twelfth threshold. Here, the first adjustment amount is larger than the second adjustment amount and the third adjustment amount, and the second adjustment amount is larger than the third adjustment amount.

As described above, based on the reliability of Strength and a difference absolute value between Strength and TargetDepth_dl, or the scene change flag, the haze depth target value calculating unit 362 may determine which one, TargetDepth_dl or Strength, is to be used for adjusting a parameter to be used in a haze removal process.

The haze depth target value calculating unit 362 that acquires TargetDepth_dl may be one example of a target value acquiring unit. Also, the haze depth target value calculating unit 362 may be one example of a difference absolute value deriving unit that calculates a difference absolute value between Strength and TargetDepth_dl. Also, the haze depth target value calculating unit 362 may be one example of a target value determining unit that determines TargetDepth for the one frame.

Figure 12:
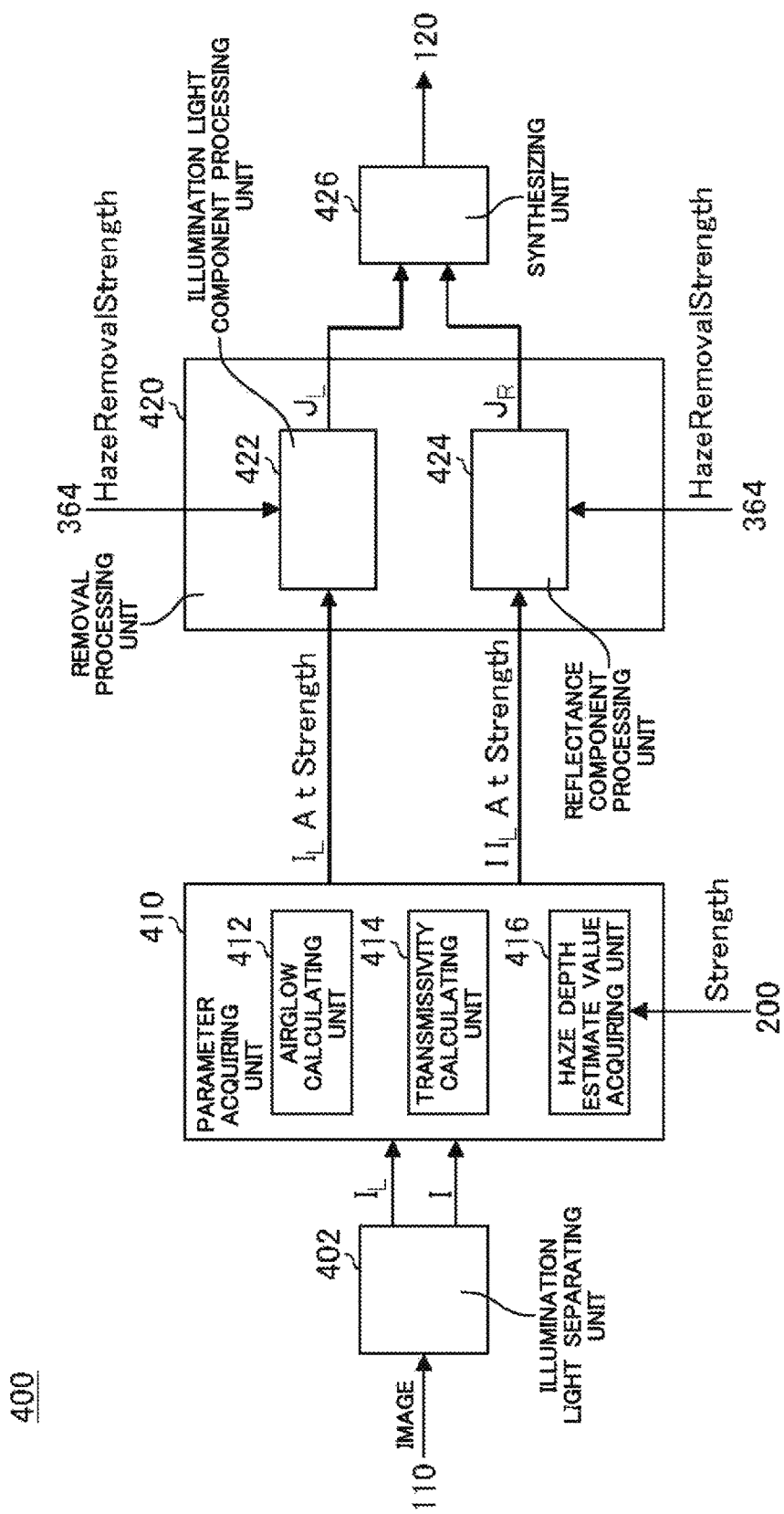
FIG. 12 schematically shows one example of a functional configuration of a haze removing unit 400.

FIG. 12 schematically shows one example of a functional configuration of the haze removing unit 400. The haze removing unit 400 includes an illumination light separating unit 402, a parameter acquiring unit 410, a removal processing unit 420 and a synthesizing unit 426.

The illumination light separating unit 402 separates an illumination light component $I_L$ from an image I input through the image input unit 110. The illumination light separating unit 402 may perform any process as long as it can separate the illumination light component $I_L$ from the image I.

For example, the illumination light separating unit 402 uses an edge-preserving low pass filter to separate the illumination light component $I_L$ from the image I. An edge-preserving low pass filter is a filter that performs smoothing while preserving edges. The illumination light separating unit 402 uses, for example, a bilateral filter as the edge-preserving low pass filter. The illumination light separating unit 402 may output the illumination light component $I_L$ and the image I to the parameter acquiring unit 410.

The parameter acquiring unit 410 acquires a parameter to be used in haze removal. The parameter acquiring unit 410 has an airglow calculating unit 412, a transmissivity calculating unit 414 and a haze depth estimate value acquiring unit 416.

The airglow calculating unit 412 calculates airglow A of the image I. The airglow calculating unit 412 may perform any process as long as it can calculate the airglow A of the image I. For example, the airglow calculating unit 412 first calculates the minimum value of RGB of each pixel of the image I and surrounding pixels thereof. Next, the airglow calculating unit 412 extracts, from the image I, pixels whose calculated minimum values are included in the top 0.1% of them. Then, the airglow calculating unit 412 treats, as the airglow A, the value of a pixel having the highest luminance among the extracted pixels.

The transmissivity calculating unit 414 calculates a transmissivity t corresponding to the haze depth of each plurality of pixels of an image input through the image input unit 110. The transmissivity calculating unit 414 may be one example of a transmissivity deriving unit. The transmissivity calculating unit 414 may perform any process as long as it can calculate the transmissivity t. For example, the transmissivity calculating unit 414 calculates the transmissivity t based on a dark channel prior (referred to as DCP in some cases) expressed by Equation 2.

$$DCP(x) = \min_{c \in r,g,b}\left(\min_{y \in \Omega(x)} (I^C(y))\right) \quad \text{[Equation 2]}$$

$I^C$ is a color channel of I, and $\Omega(x)$ is a local region having its center at x.

The transmissivity calculating unit 414 may calculate the transmissivity t from the value of DCP on the presumption that DCP in Equation 2 expresses the transmissivity t. For example, the transmissivity calculating unit 414 may calculate the transmissivity t with Equation 3.

$$t(x) = 1 - \omega \min\left(\min_{y \in \Omega(x)}\left(\frac{I^C(y)}{A^C}\right)\right) \quad \text{[Equation 3]}$$

The haze depth estimate value acquiring unit 416 acquires Strength output by the haze depth estimating unit 200.

The parameter acquiring unit 410 outputs, to the removal processing unit, the image I, the illumination light component $I_L$, the airglow A calculated by the airglow calculating unit 412, the transmissivity t calculated by the transmissivity calculating unit 414, and Strength acquired by the haze depth estimate value acquiring unit 416.

The removal processing unit 420 executes a haze removal process on the image I based on the Retinex theory expressed by Equation 4 and an atmospheric model of a hazed image expressed by Equation 5.

Input image $I$=Illumination light $L$×Reflectance $R$ [Equation 4]

Input image $I(x)$=Original image $J(x)$×Transmissivity $t(x)$+Airglow $A$(1-Transmissivity $t(x)$) [Equation 5]

Modification of Equation 5 gives Equation 6.

$$J(x) = \frac{I(x) - A}{t(x)} - A \quad \text{[Equation 6]}$$

By applying the Retinex theory to Equation 6 and expressing respective elements with the products of the reflectance component and the illumination light component, Equation (7) is obtained.

$$J_R J_L = \frac{I_R I_L - A_R A_L}{L} + A_R A_L \quad \text{[Equation 7]}$$

Here, on an assumption that approximately few or no reflectance components are included in the airglow, the removal processing unit 420 may use the atmospheric model of a hazed image and the Retinex theory to execute a haze removal process. For example, when it is supposed that reflectance components included in the airglow are very few, it can be considered that Equation 8 holds true.

$$A_R = 1 \quad \text{[Equation 8]}$$

Also, on a further assumption that the atmospheric model can be applied only to respective illumination light components of the airglow, the original image and the input image, the removal processing unit 420 may use the atmospheric model of a hazed image and the Retinex theory to execute a haze removal process. According to such an assumption, Equation 9 holds true.

$$J_L = \frac{I_L - A_L}{L} - A_L \quad \text{[Equation 9]}$$

By applying Equation 8 and Equation 9 to Equation 7, Equation 10 is obtained.

$$J_R = \frac{I_R I_L - (1-t)A_L}{I_L - (1-t)A_L} \qquad \text{[Equation 10]}$$

According to Equation 10, it can be derived that when $I_R$ is larger than 1, the value of $J_R$ becomes larger than $I_R$, and when $I_R$ is smaller than 1, the value of $J_R$ becomes smaller than $I_R$.

By using Equation 9 and Equation 10, the removal processing unit 420 may perform a haze removal process at mutually different degrees of haze removal on a reflectance component and an illumination light component. For example, the removal processing unit 420 may make the degrees of haze removal different by making the transmissivities t different in Equation 9 and Equation 10. Also, the removal processing unit 420 may make the degrees of haze removal different by weighting results of Equation 9 and Equation 10 differently.

The removal processing unit 420 has an illumination light component processing unit 422 and a reflectance component processing unit 424. The illumination light component processing unit 422 performs a haze removal process on an illumination light component of an image. The reflectance component processing unit 424 performs a haze removal process on a reflectance component of an image.

The illumination light component processing unit 422 may use HazeRemovalStrength received from the parameter adjusting unit 364 to execute a haze removal process. For example, the illumination light component processing unit 422 may use the illumination light component $I_L$, the airglow A, the transmissivity t, HazeRemovalStrength and Equation 9 to calculate the illumination light component $J_L$ on which a haze removal process has been performed. The illumination light component processing unit 422 may use HazeRemovalStrength to adjust the transmissivity t. Also, the illumination light component processing unit 422 may use HazeRemovalStrength instead of the transmissivity t. Also, the illumination light component processing unit 422 may use a value based on HazeRemovalStrength instead of the transmissivity t. When the illumination light component processing unit 422 uses HazeRemovalStrength received from the parameter adjusting unit 364 to execute a haze removal process, the parameter acquiring unit 410 does not have to have the haze depth estimate value acquiring unit 416. Also, the haze depth estimate value acquiring unit 416 may receive HazeRemovalStrength from the parameter adjusting unit 364, and transmit received HazeRemovalStrength to the removal processing unit 420.

When a still image is input through the image input unit 110, when the image processing system 100 does not includes the scene control unit 300, or in other cases, the illumination light component processing unit 422 may use the illumination light component $I_L$, the airglow A, the transmissivity t and Strength received from the parameter acquiring unit 410 and Equation 9 to calculate the illumination light component $J_L$ on which a haze removal process has been performed. The illumination light component processing unit 422 may apply Strength to the transmissivity t to calculate the illumination light component $J_L$. For example, the illumination light component processing unit 422 multiplies the transmissivity t with Strength. Also, for example, the illumination light component processing unit 422 may weight the transmissivity t according to the value of Strength. Thereby, a more highly precise haze removal process using Strength estimated by the haze depth estimating unit 200 can be realized.

The reflectance component processing unit 424 may calculate the reflectance component $I_R$ from the image I and the illumination light component $I_L$ received from the parameter acquiring unit 410. The reflectance component processing unit 424 may use HazeRemovalStrength received from the parameter adjusting unit 364 to execute a haze removal process. For example, the reflectance component processing unit 424 may use the illumination light component $I_L$, the reflectance component $I_R$, the transmissivity t, HazeRemovalStrength and Equation 10 to calculate the reflectance component $J_R$ on which a haze removal process has been performed. The reflectance component processing unit 424 may use HazeRemovalStrength to adjust the transmissivity t. Also, the reflectance component processing unit 424 may use HazeRemovalStrength instead of the transmissivity t. Also, the reflectance component processing unit 424 may use a value based on HazeRemovalStrength instead of the transmissivity t. When the reflectance component processing unit 424 uses HazeRemovalStrength received from the parameter adjusting unit 364 to execute a haze removal process, the parameter acquiring unit 410 does not have to have the haze depth estimate value acquiring unit 416. Also, the haze depth estimate value acquiring unit 416 may receive HazeRemovalStrength from the parameter adjusting unit 364, and transmit received HazeRemovalStrength to the removal processing unit 420.

When a still image is input through the image input unit 110, when the image processing system 100 does not includes the scene control unit 300, or in other cases, the reflectance component processing unit 424 may use the illumination light component $I_L$, the reflectance component $I_R$, the transmissivity t, Strength and Equation 10 to calculate $J_R$ on which a haze removal process has been performed. The reflectance component processing unit 424 may apply Strength to the transmissivity t to calculate $J_R$. For example, the reflectance component processing unit 424 multiplies the transmissivity t with Strength. Also, for example, the reflectance component processing unit 424 may weight the transmissivity t according to the value of Strength. Thereby, a more highly precise haze removal process using Strength estimated by the haze depth estimating unit 200 can be realized.

The synthesizing unit 426 synthesizes the illumination light component $J_L$ on which a haze removal process has been performed by the illumination light component processing unit 422, and the reflectance component $J_R$ on which a haze removal process has been performed by the reflectance component processing unit 424. The synthesizing unit 426 generates an output image J by synthesizing $J_L$ and $J_R$. The output image J generated by the synthesizing unit 426 may be displayed by the display unit 120.

Although in the present embodiment, an example in which the image processing system 100 is a display device including the haze depth estimating unit 200, the scene control unit 300 and the haze removing unit 400 has been explained, this is not the sole example. The image processing system 100 may be a display device including at least one among the haze depth estimating unit 200, the scene control unit 300 and the haze removing unit 400.

Also, the image processing system 100 may be a display device including only the scene change judging unit 310 among the scene change judging unit 310, the haze reliability estimating unit 330, and the haze removal parameter adjusting unit 360 that are included in the scene control unit 300. Also, the image processing system 100 may be a display device including only the haze reliability estimating unit 330. In this case, the haze depth estimate value acquiring unit 340 may acquire not Strength output by the haze depth estimating unit 200, but a haze depth estimate value estimated by another apparatus or the like.

Also, the image processing system 100 may be a display device including only the haze removing unit 400 among the haze depth estimating unit 200, the scene control unit 300 and the haze removing unit 400. In this case, the haze depth estimate value acquiring unit 416 may acquire not Strength output by the haze depth estimating unit 200, but a haze depth estimate value estimated by another apparatus or the like.

Also, although in the present embodiment, an example in which the image processing system 100 is a display device has been explained, this is not the sole example. It may be another type of apparatus as long as it is an apparatus that processes an image. For example, the image processing system 100 may be a cellular phone such as a smart phone, a tablet terminal, a personal computer, an information appliance, or the like. Also, the image processing system 100 may be an apparatus that does not have the display unit 120, but allows an external display unit to display an image.

In the explanation above, each unit of the image processing system 100 may be realized by hardware, or may be realized by software. Also, they may be realized by combinations of hardware and software. Also, execution of a program may allow a computer to function as the image processing system 100. The program may be installed, from a computer-readable medium or a storage connected to a network, in the computer that constitutes at least part of the image processing system 100.

The programs that are installed in the computer and cause the computer to function as the image processing system 100 according to the present embodiment may operate on a CPU or the like to respectively cause the computer function as respective units of the image processing system 100. Information processing described in these programs is read in by the computer to function as a specific means realized by cooperation between software and hardware resources of the image processing system 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

100: image processing system; 110: image input unit; 120: display unit; 200: haze depth estimating unit; 202: flat & edgy pixel extracting unit; 204: average luminance calculating unit; 206: average saturation calculating unit; 208: contrast calculating unit; 210: maximum saturation acquiring unit; 212: weighting acquiring unit; 214: haze depth calculating unit; 216: tool screen judging unit; 218: selector; 230: pixel of interest; 240: weighting graph; 242: weighting graph; 300: scene control unit; 310: scene change judging unit; 312: high saturation pixel extracting unit; 314: hue histogram generating unit; 316: high saturation pixel rate measuring unit; 318: flat & edgy pixel extracting unit; 320: average luminance calculating unit; 322: average saturation calculating unit; 324: judgement processing unit; 330: haze reliability estimating unit; 332: flat & edgy pixel extracting unit; 334: average luminance calculating unit; 336: high saturation pixel extracting unit; 338: high saturation pixel rate measuring unit; 340: haze depth estimate value acquiring unit; 342: reliability calculating unit (haze reliability estimating unit); 352: weighting graph; 354: weighting graph; 360: haze removal parameter adjusting unit (parameter adjusting unit); 362: haze depth target value calculating unit (target value acquiring unit, target value determining unit, difference absolute value deriving unit); 364: parameter adjusting unit (difference absolute value deriving unit); 400: haze removing unit; 402: illumination light separating unit; 410: parameter acquiring unit; 412: airglow calculating unit; 414: transmissivity calculating unit; 416: haze depth estimate value acquiring unit; 420: removal processing unit; 422: illumination light component processing unit; 424: reflectance component processing unit; 426: synthesizing unit

What is claimed is:

1. An image processing system comprising:
a haze depth estimating unit that derives a haze depth estimate value of one frame among a plurality of frames included in a moving image;
a parameter adjusting unit that adjusts a parameter to be used in a haze removal process of the one frame based on a haze depth estimate value of the one frame, and a relationship between the one frame and a past frame of the one frame; and
a haze removing unit that executes a haze removal process on the one frame based on the parameter adjusted by the parameter adjusting unit, wherein
using a haze depth estimate value of the one frame as a haze depth target value of the one frame, the parameter adjusting unit adjusts a parameter to be used in a haze removal process of the one frame such that the parameter to be used in the haze removal process of the one frame becomes closer to, in a stepwise manner, the haze depth target value, from a parameter adjusted in a haze removal process of the past frame.

2. The image processing system according to claim 1, further comprising a scene change judging unit that judges whether or not the one frame is a frame in which a scene change occurs, wherein
when the scene change judging unit judges that in a relationship between the one frame and the past frame, the one frame is a frame in which a scene change occurs, the parameter adjusting unit increases stepwidths at which the parameter is made close to, stepwise, the haze depth target value.

3. An image processing system comprising:
a haze depth estimating unit that derives a haze depth estimate value of one frame among a plurality of frames included in a moving image;
a parameter adjusting unit that adjusts a parameter to be used in a haze removal process of the one frame based on a haze depth estimate value of the one frame, and a relationship between the one frame and a past frame of the one frame;

a haze removing unit that executes a haze removal process on the one frame based on the parameter adjusted by the parameter adjusting unit;

a haze reliability estimating unit that estimates a reliability of the haze depth estimate value;

a target value acquiring unit that acquires a haze depth target value of the past frame;

a target value determining unit that determines, as a haze depth target value of the one frame, either the haze depth target value of the past frame acquired by the target value acquiring unit or a haze depth estimate value of the one frame derived by the haze depth estimating unit; and a difference absolute value deriving unit that derives a difference absolute value between a haze depth target value of the one frame determined by the target value determining unit and a parameter used in a haze removal process of a past frame of the one frame, wherein the parameter adjusting unit adjust a parameter to be used in a haze removal process of the one frame with an adjustment amount corresponding to: the reliability; the difference absolute value; and whether or not the one frame is a frame in which a scene change occurs, such that a parameter used in a haze removal process of the past frame becomes close to, stepwise, a haze depth target value of the one frame determined by the target value determining unit.

4. The image processing system according to claim 3, wherein when the one frame is judged as a frame in which a scene change occurs, the parameter adjusting unit adjusts the parameter with a first adjustment amount, when the one frame is judged as not a frame in which a scene change occurs, a reliability of the estimate value is higher than a first threshold, and the difference absolute value is higher than a second threshold, the parameter adjusting unit adjusts the parameter with a second adjustment amount smaller than the first adjustment amount, and when the one frame is judged as not a frame in which a scene change occurs, and a reliability of the estimate value is lower than the first threshold or the difference absolute value is lower than the second threshold, the parameter adjusting unit adjusts the parameter with a third adjustment amount smaller than the second adjustment amount.

5. The image processing system according to claim 1, further comprising a haze reliability estimating unit that estimates a reliability of the haze depth estimate value, wherein when the haze reliability estimating unit judges that in the one frame, the haze depth estimate value is not reliable, the parameter adjusting unit adjusts a parameter to be used in a haze removal process of the one frame such that it becomes close to, stepwise, a target value set at a time of the past frame.

6. An image processing system comprising:

a haze depth estimating unit that derives a haze depth estimate value of one frame among a plurality of frames included in a moving image;

a parameter adjusting unit that adjusts a parameter to be used in a haze removal process of the one frame based on a haze depth estimate value of the one frame, and a relationship between the one frame and a past frame of the one frame;

a haze removing unit that executes a haze removal process on the one frame based on the parameter adjusted by the parameter adjusting unit;

a haze reliability estimating unit that estimates a reliability of the haze depth estimate value;

a target value acquiring unit that acquires a haze depth target value of the past frame; and a target value determining unit that, based on the reliability estimated by the haze reliability estimating unit, determines which one, the haze depth target value of the past frame acquired by the target value acquiring unit or a haze depth estimate value of the one frame derived by the haze depth estimating unit, is to be used for adjusting a parameter to be used in a haze removal process of the one frame.

7. The image processing system according to claim 6, further comprising a difference absolute value deriving unit that derives a difference absolute value between a haze depth target value of the past frame acquired by the target value acquiring unit and the haze depth estimate value of the one frame derived by the haze depth estimating unit, wherein when the one frame is a frame in which a scene change occurs or when the one frame is not a frame in which a scene change occurs, a reliability of the estimate value is higher than a first threshold, and the difference absolute value is higher than a second threshold, the target value determining unit determines to use a haze depth estimate value of the one frame for adjusting a parameter to be used in a haze removal process of the one frame, and when the one frame is not a frame in which a scene change occurs, and a reliability of the estimate value is lower than the first threshold or the difference absolute value is lower than the second threshold, the target value determining unit determines to use a haze depth target value of the past frame for adjusting a parameter to be used in a haze removal process of the one frame.

8. A non-transitory computer-readable recording medium having recorded thereon a program for allowing a computer to function as:

a haze depth estimating unit that derives a haze depth estimate value of one frame among a plurality of frames included in a moving image;

a parameter adjusting unit that adjusts a parameter to be used in a haze removal process of the one frame based on a haze depth estimate value of the one frame, and a relationship between the one frame and a past frame of the one frame; and a haze removing unit that executes a haze removal process on the one frame based on the parameter adjusted by the parameter adjusting unit, wherein using a haze depth estimate value of the one frame as a haze depth target value of the one frame, the parameter adjusting unit adjusts a parameter to be used in a haze removal process of the one frame such that the parameter to be used in the haze removal process of the one frame becomes closer to, in a stepwise manner, the haze depth target value, from a parameter adjusted in a haze removal process of the past frame.

9. A non-transitory computer-readable recording medium having recorded thereon a program for allowing a computer to function as:

a haze depth estimating unit that derives a haze depth estimate value of one frame among a plurality of frames included in a moving image;

a parameter adjusting unit that adjusts a parameter to be used in a haze removal process of the one frame based on a haze depth estimate value of the one frame, and a relationship between the one frame and a past frame of the one frame;

a haze removing unit that executes a haze removal process on the one frame based on the parameter adjusted by the parameter adjusting unit;

a haze reliability estimating unit that estimates a reliability of the haze depth estimate value;

a target value acquiring unit that acquires a haze depth target value of the past frame;

a target value determining unit that determines, as a haze depth target value of the one frame, either the haze depth target value of the past frame acquired by the target value acquiring unit or a haze depth estimate value of the one frame derived by the haze depth estimating unit; and a difference absolute value deriving unit that derives a difference absolute value between a haze depth target value of the one frame determined by the target value determining unit and a parameter used in a haze removal process of a past frame of the one frame, wherein the parameter adjusting unit adjusts a parameter to be used in a haze removal process of the one frame with an adjustment amount corresponding to: the reliability; the difference absolute value; and whether or not the one frame is a frame in which a scene change occurs, such that a parameter used in a haze removal process of the past frame becomes close to, stepwise, a haze depth target value of the one frame determined by the target value determining unit.

10. A non-transitory computer-readable recording medium having recorded thereon a program for allowing a computer to function as:

a haze depth estimating unit that derives a haze depth estimate value of one frame among a plurality of frames included in a moving image;

a parameter adjusting unit that adjusts a parameter to be used in a haze removal process of the one frame based on a haze depth estimate value of the one frame, and a relationship between the one frame and a past frame of the one frame;

a haze removing unit that executes a haze removal process on the one frame based on the parameter adjusted by the parameter adjusting unit;

a haze reliability estimating unit that estimates a reliability of the haze depth estimate value;

a target value acquiring unit that acquires a haze depth target value of the past frame; and a target value determining unit that, based on the reliability estimated by the haze reliability estimating unit, determines which one, the haze depth target value of the past frame acquired by the target value acquiring unit or a haze depth estimate value of the one frame derived by the haze depth estimating unit, is to be used for adjusting a parameter to be used in a haze removal process of the one frame.

\* \* \* \* \*